United States Patent
Skeen et al.

(10) Patent No.: US 7,284,196 B2
(45) Date of Patent: Oct. 16, 2007

(54) VOCABULARY AND SYNTAX BASED DATA TRANSFORMATION

(75) Inventors: Marion Dale Skeen, Atherton, CA (US); Tony Sang-min Lee, Palo Alto, CA (US)

(73) Assignee: Vitria Technology, Inc., Sunnyvale, CA (US)

(*) Notice: Subject to any disclaimer, the term of this patent is extended or adjusted under 35 U.S.C. 154(b) by 372 days.

(21) Appl. No.: 10/265,162

(22) Filed: Oct. 7, 2002

(65) Prior Publication Data

US 2003/0088543 A1  May 8, 2003

Related U.S. Application Data

(60) Provisional application No. 60/327,087, filed on Oct. 5, 2001.

(51) Int. Cl.
*G06F 15/00* (2006.01)
*G06F 17/00* (2006.01)
*G06F 17/30* (2006.01)
*G06F 7/00* (2006.01)

(52) U.S. Cl. .............. 715/523; 715/513; 715/532; 707/1

(58) Field of Classification Search .......... 715/523, 715/513, 532; 707/1
See application file for complete search history.

(56) References Cited

U.S. PATENT DOCUMENTS

| | | | |
|---|---|---|---|
| 5,523,946 A | | 6/1996 | Kaplan et al. |
| 5,677,835 A | | 10/1997 | Carbonell et al. |
| 5,983,169 A | | 11/1999 | Kozma |
| 5,995,920 A | * | 11/1999 | Carbonell et al. ............ 704/9 |
| 6,363,337 B1 | | 3/2002 | Amith |
| 6,463,404 B1 | | 10/2002 | Appleby |
| 6,687,873 B1 | * | 2/2004 | Ballantyne et al. ......... 715/500 |
| 6,701,314 B1 | * | 3/2004 | Conover et al. ............... 707/7 |
| 6,742,054 B1 | * | 5/2004 | Upton, IV ..................... 710/6 |
| 6,772,216 B1 | * | 8/2004 | Ankireddipally et al. ... 709/230 |
| 6,829,745 B2 | * | 12/2004 | Yassin et al. ............... 715/513 |
| 6,847,974 B2 | * | 1/2005 | Wachtel ..................... 707/101 |
| 6,925,453 B1 | * | 8/2005 | Bergman et al. ............. 706/20 |
| 2002/0049790 A1 | * | 4/2002 | Ricker et al. ............... 707/513 |
| 2002/0091533 A1 | * | 7/2002 | Ims et al. ..................... 705/1 |
| 2002/0116205 A1 | * | 8/2002 | Ankireddipally et al. ...... 705/1 |
| 2003/0018660 A1 | * | 1/2003 | Martin et al. ............... 707/500 |

(Continued)

OTHER PUBLICATIONS

Glushko, Robert J., et al., "An XML Framework for Agent-based E-commerce", Communications of the ACM, vol. 42 No. 3, Mar. 1999, pp. 106-114.*

(Continued)

*Primary Examiner*—Shahid Alam
*Assistant Examiner*—Robert Stevens
(74) *Attorney, Agent, or Firm*—Marc S. Kaufman; Nixon Peabody LLP

(57) ABSTRACT

A framework for accomplishing vocabulary-based data transformations, for interfacing systems of disparate data formats. The framework is layered to separate the terms of documents form the underlying concepts corresponding thereto. The layers include an ontology layer for defining concepts, a vocabulary layer for labeling the concepts, a specification layer that specifies the concepts and labels, and a representation layer for encoding data in conformance with the specification layer. The separation enables the relationships between existing transformations to be automatically leveraged for minimizing user input for creating new transformations.

7 Claims, 23 Drawing Sheets

U.S. PATENT DOCUMENTS

| | | | |
|---|---|---|---|
| 2003/0069975 A1* | 4/2003 | Abjanic et al. | 709/227 |
| 2003/0126136 A1* | 7/2003 | Omoigui | 707/10 |
| 2003/0149934 A1* | 8/2003 | Worden | 715/513 |
| 2003/0179228 A1* | 9/2003 | Schreiber et al. | 345/738 |

OTHER PUBLICATIONS

Smith, Howard, et al., "Share the Ontology in XML-based Trading Architectures", Communications of the ACM, vol. 42 No. 3, Mar. 1999, pp. 110-111 [ACM 0002-0782/99/0300].*

Ströbel, Michael, "Communication Design for Electronic Negotiations on the Basis of XML Schema", WWW 10, Hong Kong, May 1-5, 2001, pp. 9-20 [ACM 1-58113-348-0/01/0005].*

Carr, Leslie, et al., "Conceptual Linking: Ontology-based Open Hypermedia", WWW 10, Hong Kong, May 1-5, 2001, pp. 334-342 [ACM 1-58113-348-0/01/0005].*

Ouskel, Aris M., et al., "Semantic Interoperability in Global Information Systems", SIGMOD Record, vol. 28 No. 1, Mar. 1999, pp. 5-12.*

Fowler, Jerry, et al., "Agent-Based Semantic Interoperability in InfoSleuth", SIGMOD Record, vol. 28 No. 1, Mar. 1999, pp. 60-67.*

Ishikawa, Hiroshi, et al., "Querying Web Distributed Databases for XML-based E-Businesses: Req't Analysis, Design, and Implementation", Proc's of the 12th Australasian Conf. on DB Technologies, Jan. 2001, pp. 60-67 [IEEE 1530-0919/01] (plus citation page).*

Omelayenko, Borys, "Integration of Product Ontologies for B2B Marketplaces: A Preview", ACM SIGecom Exchanges, vol. 2 Issue 1, Dec. 2000, pp. 19-25 (plus citation page).*

Karp, Dr. Peter, "Bio-Ontologies: Tools, Techniques, and Examples", Third Annual Bio-Ontologies Meeting, La Jolla, CA, Sponsored by SmithKlineBeecham, Aug. 24, 2000, pp. 1-49.*

Fensel, Dieter, "Ontologies: Silver Bullet for Knowledge Management and Electronic Commerce", IFIP WG 2.6, Amsterdam, The Netherlands, Oct. 25-27, 1999, pp. 1-32.*

"VerticalNet: Distributed Content Management for the Market-Enabled Supply Chain", VerticalNet Capabilities Briefing, May 31, 2001, pp. 1-24.*

Brandsma, Dan, "Space Surveillanced Ontology Overview: Captured in an XML Schema", Mitre Briefing, Colorado Springs, CO, Oct. 25-27, 1999, pp. 1-32.*

Pulvermacher, Mary K., et al., "Space Surveillanced Ontology: Captured in an XML Schema", Mitre Paper No. MP00B000055, Oct. 2000, pp. i-xi, 1-1-1-3, 2-1-2-11, 3-1-3-16, 4-1-4-6, RE-1-RE-2 and A-1.*

Amann, Bernd, et al., editors, "C-Web: Functional Specification (V1.0)", May 23, 2001, pp. 1-39.*

Hunter, Jane, "Combining RDF and XML Schemas to Enhance Interoperability Between Metadata Application Profiles", WWW10, May 1-5, 2001, pp. 457-466 [ACM1-58113-348-0/01/0005].*

Broekstra, Jeen, "Enabling Knowledge Representation on the Web by Extending RDF Schema", WWW 10, May 1-5, 2001, pp. 467-478 [ACM 1-58113-348-0/01/0005].*

Kay, Emily, "Until the Emerging XML Standard Matures. IT Mgrs Will Need a Patchwork of Tools and Services to Find Their Way From EDI to XML and Back", ComputerWorld, Jun. 19, 2000, pp. 1-5 [www.opticality.com/Press/XMLS/ComputerWorld20000619/view].*

American Heritage Dictionary, 4th Edition, Houghton Mifflin Co., Boston, (c) 2002, p. 1413.*

Decker, Stefan, et al., "The Semantic Web: The Roles of XML and RDF", IEEE Internet Computing, Sep.-Oct. 2000, pp. 63-74.*

Heflin, Jeff, et al., "A Portrait of the Semantic Web in Action", IEEE Intelligent Systems, vol. 16, Issue 2, Mar./Apr. 2001, pp. 54-59.*

Klein, Michel, "XML, RDF, and Relatives", IEEE Intelligent Systems, vol. 16, Issue 2, Mar./Apr. 2001, pp. 26-28.*

Fensel, Dieter, et al., "OIL: An Ontology Infrastructure for the Semantic Web", IEEE Intelligent Systems, vol. 16, Issue 2, Mar./Apr. 2001, pp. 38-45.*

Erdmann, Michael, et al., "How to Structure and Access XML Documents With Ontologies", Data & Knowledge Engineering, vol. 36, No. 3, Mar. 2001, pp. 317-335.*

Klein, M., et al., "The Relation Between Ontologies and Schema-Languages: Translating OIL Specifications in XML Schema", Proc. Workshop on Applications of Ontologies and Problem-Solving Methods, 14th European Conf. on AI, Berlin, © 2000, pp. 1-19.*

Gruber, Thomas R., "A Translation Approach to Portable Ontology Specifications", Knowledge Systems Laboratory Technical Report KSL 92-71, Stanford University, Stanford, CA, © 1993, cover + pp. 1-23.*

Connelly, David, XML "Standards for Business Messages", OOPSLA 2000, Minneapolis, MN, Oct. 17, 2000, pp. 1-37.*

Farquhar, Adam, et al., "The Ontolingua Server: A Tool For Collaborative Ontology Construction", Stanford University Knowledge Systems Laboratory, Aug. 30, 2000, pp. 1-25 (downloaded from: web.archive.org/web/20000830111524/http://ksi.cpsc.ucalgary.ca/KAW/KAW96/farquhar-demo/farquhar-demo.html).*

Vossen, Piek, "Right or Wrong. Combining Lexical Resources in the EuroWorldNet Project", Proceedings of Euralex-96, Goetheborg, © 1996, pp. 1-14.*

Cui, Zhan, et al., "Domain Ontology Management Environment", Proceedings of the 33rd Hawaii International Conference on System Sciences, Jan. 4-7, 2000, pp. 1-9.*

Rodriguez, Horacio, et al., "The Top-Down Strategy for Building EuroWordNet: Vocabulary Coverage, Base Concepts and Top Ontology", Computers and the Humanities, vol. 32 Nos. 2-3, Mar. 1998, pp. 117-152.*

Peters, Wim, et al., "Cross-Linguistic Alignment of Wordnets with an Inter-Lingual-Index", Computers and the Humanities, vol. 32 Nos. 2-3, Mar. 1998, pp. 221-225.*

PCT International Search Report dated Feb. 14, 2003 (PCT/US02/31841).

* cited by examiner

| ID | Terms |
|---|---|
| 2000 | Ship-to Address |
| 2001 |     Name of Recipient |
| 2002 |     Company Name |
| 2003 |     Street with apartment number |
| 2004 |     City |
| 2005 |     State |
| 2006 |     Postal Code |
| 2007 |     Country |
| 2008 |     Cross Street |
| 2009 |     Routing Information |

| ID | Terms |
|---|---|
| 10000 | Ship-to Address |
| 10001 |     Name of Recipient |
| 10002 |     Company Name |
| 10003 |     Address |
| 10004 |         Street # |
| 10005 |         Street |
| 10006 |         name |
| 10007 |         Apt. # |
| 10008 |         Floor # |
| 10009 |     City |
| 10010 |     State |
| 10011 |     Postal Code |
| 10012 |     Country |
| 10013 |     Cross Street Routing Information |

| ID | Terms | Wireless | French Dialect |
|---|---|---|---|
| 2000 | Ship-To Address | Ship-Adr | Addresse Livraison |
| 2001 | Name of Recipient | Name | Nom du Destinataire |
| 2002 | Company Name | Cpy | Nom de Societe |
| 2003 | Street | Str | Rue |
| 2004 | City | City | Ville |
| 2005 | State | State | Departement |
| 2006 | Postal Code | PC | Code Postal |
| 2007 | Country | CTRY | Pays |
| 2008 | Cross Street | X-Str | Intersection |
| 2009 | Routing Information | Rte | Circuit Routier |

Fig. 10

```
<!ELEMENT ShipToAddress (NameOfRecipient, CompanyName, Street, City,
State, PostalCode, Country, CrossStreet, RoutingInformation)>
<!ELEMENT NameOfRecipient (#PCDATA)>
<!ELEMENT CompanyName (#PCDATA)>
<!ELEMENT Street (#PCDATA)>
<!ELEMENT City (#PCDATA)>
<!ELEMENT State (#PCDATA)>
<!ELEMENT PostalCode (#PCDATA)>
<!ELEMENT Country (#PCDATA)>
<!ELEMENT CrossStreet (#PCDATA)>
<!ELEMENT RoutingInformation (#PCDATA)>
```

Fig. 11

```
<xsd:schema xmlns:xsd="http://www.w3.org/2001/XMLSchema">

<xsd:element name="ShipToAddress" type="address"/>

<xsd:complexType name="address">
  <xsd:sequence>
   <xsd:element name="NameOfRecipient" type="xsd:string"/>
   <xsd:element name="CompanyName" type="xsd:string"/>
   <xsd:element name="Street" type="xsd:string"/>
   <xsd:element name="City" type="xsd:string"/>
   <xsd:element name="State" type="xsd:string"/>
   <xsd:element name="PostalCode" type="xsd:decimal"/>
   <xsd:element name="Country" type="xsd:string"/>
   <xsd:element name="CrossStreet" type="xsd:string"/>
   <xsd:element name="RoutingInformation" type="xsd:string"/>
  </xsd:sequence>
 </xsd:complexType>
</xsd:schema>
```

Fig. 12

```
Segment ID              Description
N1                      Name
N2                      Additional Name Information
N3                      Address Location
N4                      Geographic Location Segment N1:
Ref ID                  Description                     Attributes
N101                    Entry Identifier Code           M ID 2/2
N102                    Name                            X AN 1/35
N103                    Identification Code Qualifier   X ID 1/2
N104                    Identification Code             X AN 2/17

Segment N2:
Ref ID                  Description                     Attributes
N201                    Name                            M AN 1/35
N202                    Name                            O AN 1/35

Segment N3:
Ref ID                  Description                     Attributes
N301                    Address Information             M AN 1/35
N302                    Address Information             O AN 1/35

Segment N4:
Ref ID                  Description                     Attributes
N401                    City                            O AN 2/35
N402                    State                           O ID 2/2
N403                    Postal Code                     O ID 3/9
N404                    Country Code                    O ID 2/3
N405                    Location Qualifier              X ID 1/2
N406                    Location Identifier             O AN 1/30
N407
```

Fig. 13

```
<ShipToAddress>
    <NameOfRecipient>John Doe</NameOfRecipient>
    <CompanyName>Vitria Technology</CompanyName>
    <Street>945 Stewart Drive</Street>
    <City>Sunnyvale</City>
    <State>California</State>
    <PostalCode>94086</PostalCode>
    <Country>USA</Country>
    <CrossStreet>Duane</CrossStreet>
    <RoutingInformation>Engineering</RoutingInformation>
</ShipToAddress>
```

Fig. 14

```
N1*SH*John Doe*1*9998887<CR>
N2*Vitria Technology*Engineering<CR>
N3*945 Stewart Drive*x-street Duane<CR>
N4*Sunnyvale*CA*94086*US*EN*34532<CR>
```

Fig. 15

```
PurchaseOrder
        PurchaseOrder Number
        OrderDate
        Name
        Items: sequence of Item
                Item number
                SKU
                Name
                Description
                Quantity
                Price
                Amount
                Shipping Address
                Billing Address
```

Fig. 16

```xml
<xsd:schema xmlns:xsd="http://www.w3.org/2001/XMLSchema">

<xsd:element name="PurchaseOrder" type="purchaseorder"/>

<xsd:complexType name="conceptString">
 <xsd:simpleContent>
  <xsd:extension base="xsd:string">
   <xsd:attribute name="conceptID" type="xsd:string" use="required"/>
  </xsd:extension>
 </xsd:simpleContent>
</xsd:complexType>

<xsd:complexType name="conceptDecimal">
 <xsd:simpleContent>
  <xsd:extension base="xsd:decimal">
   <xsd:attribute name="conceptID" type="xsd:string" use="required"/>
  </xsd:extension>
 </xsd:simpleContent>
</xsd:complexType>

<xsd:complexType name="conceptFloat">
 <xsd:simpleContent>
  <xsd:extension base="xsd:float">
   <xsd:attribute name="conceptID" type="xsd:string" use="required"/>
  </xsd:extension>
 </xsd:simpleContent>
</xsd:complexType>

<xsd:complexType name="purchaseorder">
 <xsd:sequence>
  <xsd:element name="PurchaseOrderNumber" type="conceptDecimal">
  <xsd:element name="OrderDate" type="conceptString"/>
  <xsd:element name="Name" type="conceptString"/>
  <xsd:element name="Items" minOccurs="0" maxOccurs="unbounded">
   <xsd:complexType>
    <xsd:element name="ItemNumber" type="conceptDecimal"/>
    <xsd:element name="SKU" type="conceptString"/>
    <xsd:element name="Name" type="conceptString"/>
    <xsd:element name="Description" type="conceptString"/>
    <xsd:element name="Quantity" type="conceptDecimal"/>
    <xsd:element name="Price" type="conceptFloat"/>
    <xsd:element name="Amount" type="conceptDecimal"/>
    <xsd:element name="ShippingAddress" type="conceptString">
    <xsd:element name="BillingAddress" type="conceptString"/>
   </xsd:complexType>
  </xsd:element>
 </xsd:sequence>
 <xsd:attribute name="conceptID" type="xsd:string" use="required"/>
</xsd:complexType>

</xsd:schema>
```

Fig. 17

```
<xsd:schema xmlns:xsd="http://www.w3.org/2001/XMLSchema">

<xsd:element name="PurchaseOrder" type="purchaseorder"/>

<xsd:complexType name="purchaseOrderNumberType">
 <xsd:simpleContent>
  <xsd:extension base="xsd:string">
   <xsd:attribute name="conceptID" type="xsd:string" fixed="C001"/>
  </xsd:extension>
 </xsd:simpleContent>
</xsd:complexType>

<xsd:complexType name="orderDateType">
 <xsd:simpleContent>
  <xsd:extension base="xsd:string">
   <xsd:attribute name="conceptID" type="xsd:string" fixed="C002"/>
  </xsd:extension>
 </xsd:simpleContent>
</xsd:complexType>

<xsd:complexType name="customerNameType">
 <xsd:simpleContent>
  <xsd:extension base="xsd:string">
   <xsd:attribute name="conceptID" type="xsd:string" fixed="C003"/>
  </xsd:extension>
 </xsd:simpleContent>
</xsd:complexType>

<xsd:complexType name="itemNumberType">
 <xsd:simpleContent>
  <xsd:extension base="xsd:decimal">
   <xsd:attribute name="conceptID" type="xsd:string" fixed="C004"/>
  </xsd:extension>
 </xsd:simpleContent>
</xsd:complexType>

<xsd:complexType name="skuType">
 <xsd:simpleContent>
  <xsd:extension base="xsd:string">
   <xsd:attribute name="conceptID" type="xsd:string" fixed="C005"/>
  </xsd:extension>
 </xsd:simpleContent>
</xsd:complexType>

<xsd:complexType name="itemNameType">
 <xsd:simpleContent>
  <xsd:extension base="xsd:string">
   <xsd:attribute name="conceptID" type="xsd:string" fixed="C006"/>
  </xsd:extension>
 </xsd:simpleContent>
</xsd:complexType>

<xsd:complexType name="descriptionType">
 <xsd:simpleContent>
  <xsd:extension base="xsd:string">
   <xsd:attribute name="conceptID" type="xsd:string" fixed="C007"/>
  </xsd:extension>
 </xsd:simpleContent>
</xsd:complexType>
```

Fig. 18

```
<xsd:schema xmlns:xsd="http://www.w3.org/2001/XMLSchema">

<xsd:element name="PurchaseOrder" type="purchaseorder"/>

<xsd:complexType name="purchaseorder">
 <xsd:sequence>
  <xsd:element name="PurchaseOrderNumber" type="xsd:string">
  <xsd:element name="OrderDate" type="xsd:string"/>
  <xsd:element name="Name" type="xsd:string"/>
  <xsd:element name="Items" minOccurs="0" maxOccurs="unbounded">
   <xsd:complexType>
    <xsd:element name="ItemNumber" type="xsd:string"/>
    <xsd:element name="SKU" type="xsd:string"/>
    <xsd:element name="Name" type="xsd:string"/>
    <xsd:element name="Description" type="xsd:string"/>
    <xsd:element name="Quantity" type="xsd:string"/>
    <xsd:element name="Price" type="xsd:string"/>
    <xsd:element name="Amount" type="xsd:string"/>
    <xsd:element name="ShippingAddress" type="xsd:string"/>
    <xsd:element name="BillingAddress" type="xsd:string"/>
   </xsd:complexType>
  </xsd:element>
 </xsd:sequence>
</xsd:complexType>

</xsd:schema>
```

Fig. 19

```
<xsd:schema xmlns:xsd="http://www.w3.org/2001/XMLSchema">

<xsd:element name="PurchaseOrder" type="purchaseorder"/>

<xsd:complexType name="purchaseorder">
  <xsd:sequence>
   <xsd:element name="PurchaseOrderNumber" type="xsd:string">
   <xsd:element name="OrderDate" type="xsd:string"/>
   <xsd:element name="Name" type="xsd:string"/>
   <xsd:element name="Items" minOccurs="0" maxOccurs="unbounded">
    <xsd:complexType>
     <xsd:element name="ItemNumber" type="xsd:string"/>
     <xsd:element name="SKU" type="xsd:string"/>
     <xsd:element name="Name" type="xsd:string"/>
     <xsd:element name="Description" type="xsd:string"/>
     <xsd:element name="Quantity" type="xsd:string"/>
     <xsd:element name="Price" type="xsd:string"/>
     <xsd:element name="Amount" type="xsd:string"/>
     <xsd:element name="ShippingAddress" type="xsd:string"/>
     <xsd:element name="BillingAddress" type="xsd:string"/>
    </xsd:complexType>
   </xsd:element>
  </xsd:sequence>
 </xsd:complexType>

</xsd:schema>
```

VOCABULARY AND SYNTAX BASED DATA TRANSFORMATION

BACKGROUND

The invention relates generally to data transformation and more specifically, to a system and method for accomplishing various data transformations in an automated manner using plural vocabularies and established relationships therebetween.

Electronic commerce, sometimes known as "e-commerce", is well known generally. The objective of e-commerce is to eliminate manual trading processes by allowing internal applications of different entities, known as "trading partners," to directly exchange information. The objective of e-commerce is to minimize the need for manual information exchange in traditional commerce. Many large companies have effected electronic commerce using a data interchange format known as "Electronic Data Interchange" (EDI). EDI has proven itself to be very effective.

The Internet and extensible markup language (XML) have created forms of data interchange that are less expensive and thus have lowered the barriers to entry for accomplishing data interchange generally and e-commerce in particular. Many newer e-commerce systems currently are based on XML. Similar to EDI systems, these newer systems allow the internal applications of different companies to share information directly and thus eliminate the need for manual communication relating to transactions. Data is placed between descriptive XML tags as metadata. XML messages are thus rich in metadata making them easy to read and debug. Further, the simplicity of XML permits persons with limited training to develop and maintain XML-based applications, in turn making XML applications less expensive to implement.

Notwithstanding the characterization of EDI as a "standard," there are many approaches to EDI. First, EDI is defined by two distinct standards, ASC X12 and EDIFACT, both of which are hereby incorporated herein by reference. ASC X12 is the standard for EDI in the United States and has evolved over the years. EDIFACT is the international standard, endorsed by the United Nations and designed from the ground up beginning in 1985. Further, X12 and EDIFACT each have several version releases of their message formats. Compatibility between versions is not always straightforward. In addition, there are other groups such as the Open Buying Initiative (OBI) proposing standards for implementing EDI messages over hypertext transfer protocol (HTTP).

XML-based e-commerce is even more diversified. As of August 2000, nearly one hundred XML-only standards were under development. Microsoft™, Ariba™, IBM™ and almost 30 other technology companies have combined to create UDDI (Universal Description Discovery and Integration), which will allows companies to publish information about the Web services they offer in a Universal Business Registry that will be accessible by anyone. RosettaNet™ is developing XML standards for product catalogs. Commerce One™ has created the common business library (CBL). Ariba™ has developed commerce XML (cXML), a proposed standard for catalogs and purchase orders.

Accordingly, businesses wishing to conduct electronic commerce must deal with a variety of documents in a variety of formats. Further, even within a single enterprise, various business processes can be controlled by plural systems using a variety of standard and/or proprietary records and message formats. Consider the following Example, as illustrated in FIG. 1. Buyer 120 sends a Purchase Order as an EDI document to Seller 110. In order to process this request, Seller 110 in a typical scenario may need to perform several translations and transformations on this document to communicate with various systems.

The original EDI Purchase Order document may need to be converted to an equivalent XML document, with the same schema (or structure) and the same semantics (or meaning). This is a format translation between two different, but semantically equivalent document formats. The XML version may also need to be converted to from the English language to the French language, so that French partner 150 can receive a copy. This is a vocabulary translation that changes the names of fields, but not necessarily their meaning.

Also, the XML version of the Purchase Order may need to be translated into Wireless Markup Language (WML) to communicate specifics of the Purchase Order to wireless device 160, such as a PDA or a cell phone. This is both a vocabulary translation and a subsetting of the document, without a change in the semantics of the data. The XML version of the Purchase Order may also need to be transformed into a different kind of XML Purchase Order, one that is acceptable to Sellers Customer Relationship Management (CRM) system 130 for example. This could be a semantic transformation of the information in the Purchase Order in which both semantics and structure of the data may be changed.

The Purchase Order may further need to be transformed into the proprietary format of an Enterprise Resource Planning (ERP) system 140. This could involve both a semantic transformation and a format translation. In some cases, the Purchase Order may need to be converted from one version of EDI to another for party 170, EDI Version 2 into EDI Version 3 for example. This involves a simple semantic transformation between two versions that are related and mostly the same. Information in the Purchase Order also needs to be copied into the Shipment documents that will be returned back to the Buyer 120, as an EDI document in this example. This kind of transformation would tend to preserve the structure and semantics of the copied field. However the overall structure of the document might not be preserved. The roles of some fields may change, for example the "Ship-to Address" in the Purchase Order may become the "Final Destination Address" in the shipping documents, with additional intermediate shipping addresses added.

The above example illustrates some of the different translation and transformation problems facing a typical enterprise that must integrate multiple applications and interact with multiple partners. These translation and transformation problems can be automated today using so-called transformation tools. The use of such tools involves a "design" or specification phase, where the transformation to be performed is specified, and then an "execution" (also called a "runtime") phase, where the transformations are automated based on the specification generated during the design phase. The design phase is the key, since only if the design phase is performed carefully and completed, resulting in a correct and complete transformation specification, will the transformation tool be able to perform the transformations correctly during the execution phase.

Conventionally, the design phase is largely a manual operation and can be very time-consuming, especially given the large size of the documents. It is not uncommon for an EDI document to contain thousands of fields. Moreover, a large corporation may typically use thousands to tens of thousands of different document types, with each document requiring multiple transformations. Note that EDI specifies more than 4000 different document types, and this is only one of many sources for documents. In fact, a large corporation may have a thousand or more applications, each being a source of documents. Given the large number of document types, the sheer size of many of the different types, and the number of different transformations required, it is not surprising that a key goal of modern transformation tools is to reduce the amount of manual work required during the design phase.

Current transformation tools normally do not distinguish among these different kinds of translations and transformations that are illustrated in the example above. Current tools tend to treat all transformation problems as a generalized "semantic translation" problem, and tend to ignore the relationships that may exist between the source and target documents. Since semantic transformations between unrelated documents is the hardest kind of transformation to automate, such transformation tools require a lot of human effort in order to specific the transformation.

For example, if a Change Order is being submitted, which revises some of the information in the original Purchase Order. The Change Order, generally speaking, will need to undergo the same translations and transformations that the original Purchase Order underwent. However, the schema and semantics of the information in the Change Order might be very similar to that of the Purchase Order. Further, many of the fields in the two documents are the same. However, without a formal way to leverage the relationships between documents, the specification phase is still complex. The example above is a simple example illustrating how complex the specification process for various transactions can become. In practical circumstances there are a myriad of data formats, vocabularies, and languages that must all be reconciled to achieve true collaboration.

Metadata, data that describes data, has been leveraged in an attempt to lend semantic context to digital messages. For example, the concept of the "Semantic Web" and related technologies, such as Resource Description Framework (RDF) and XML Topic Maps have recently been developed. The Semantic Web concept is directed to making information available over the World Wide Web in a form that indicates the underlying meaning of the data. These technologies provide standard syntaxes for describing metadata using a well-defined XML syntax. This tells a program how to parse the metadata, but not yet what it means. Meaning is introduced to the syntax by what can be described as "meta-metadata." Examples are Containers in RDF Schema, Superclasses in XML Topic Maps, and Collections in DAML+OIL. This layer enables the definition of Ontologies and Vocabularies.

XML Topic Maps, RDF/RDF Schema, and DAML+OIL are general approaches for identifying subjects and resources and defining the relationships between them. One may categorize them as efforts for defining the nature and specification languages for Ontologies. All of this work is focused on defining and enabling the Semantic Web. However, the Semantic Web does not address transformations and thus conventional technologies have failed to harness metadata to the extent necessary to facilitate the creation of various transformations with reduced human intervention.

XEDI™, owned by Vitria Technology, Inc., is an example of a Vocabulary and Ontology that is specific for EDI. The XEDI™ specification is in XML DTDs with embedded concept identifiers thus conforming to the component based specification form. Contivo™ has taken an approach to transformation that appears to be based on synonym matching and a rules engine for building transformations. An example of a rule given in the Contivo™ literature is to truncate data if the target field is shorter than the source. Tibco Designer 5.0™ is described as having exposed metadata APIs to allow applications to access the metadata associated with content. Tibco™ literature describes the benefit from the metadata as allowing two applications to share the meaning of a specific content item.

The transformation of documents and data is both a common problem and an onerous problem. As the example in FIG. 1 illustrates, it is comes in many guises and may occur many times in the course of processing a straightforward data task, such as submitting a Purchase Order. The sheer frequency of occurrence, together with the size of the vocabularies and documents involved makes it a costly problem to solve. It has been estimated that over 30% of the cumulative Information Technology (IT) budget for large enterprises goes to integration of disparate applications and systems, and that 70% of these integration costs are applied to solving transformation problems. Given that it is estimated that a more than a trillion dollars is spent on IT technology annually, this makes transformation a problems whose costs are measured in hundreds of billions of dollars.

The huge cost associated with transformation can be attributed in large part to sheer size of the vocabularies and documents involved. For example, the EDI X12 vocabulary contains hundreds of different document types, of which a Purchase Order is one type of document. A typical document, such as the Purchase Order, may contain more than a thousand defined elements. Hence, an extensive vocabulary, such as EDI X12, can easily define more than a hundred thousand elements. A large enterprise typically has more than a thousand different applications, each defining their own vocabulary. While not all document types or vocabularies need to be transformed to one another, nonetheless, it is easy to see why transformation quickly becomes a large problem. Conventional technologies fail to leverage the power of metadata and established relationships between terms in documents. Accordingly, complex transformations require a great deal of manual operations in the design phase.

In the example given above with respect to FIG. 1, It would be highly advantageous if the transformation tools could make use of the fact that the Purchase Order and the Change Order are semantically and schematically similar. Ideally, if transformation specifications have already defined for the Purchase Order, then the transformation tool should be intelligent enough to re-use those same specifications in the context of the Change Order. Hence, the transformation tool should only require transformation specification for the new or changed fields in the Change Order. Today's transformation tools are generally unable to recognize that two different documents may be related and share semantically equivalent fields. Moreover today's tools generally cannot identify and re-use transformation specifications among related documents.

SUMMARY OF THE INVENTION

A first aspect of the invention is a framework for accomplishing vocabulary-based data transformations. The framework comprises an ontology layer for defining concepts, a vocabulary layer for labeling the concepts, a specification layer that specifies the concepts and labels, and a representation layer for encoding data in conformance with the specification layer.

BRIEF DESCRIPTION OF THE DRAWINGS

The invention is described through a preferred embodiment and the attached drawing in which:

FIG. 3 is an example of a human readable representation of an ontology;

FIG. 4 is another example of a human readable representation of an ontology;

FIG. 10 is an example of an XML DTD specification;

FIG. 11 is an example of an XML Schema specification;

FIG. 12 is an example of an EDI specification;

FIG. 13 is a document instance corresponding to the specification of FIG. 10;

FIG. 14 is a document instance corresponding to the specification of FIG. 12;

FIG. 15 is an example of a purchase order definition;

FIG. 16 is an example of a component structured specification;

FIG. 17 is another example of a component structured specification;

FIG. 18 is an example of a type based specification;

FIG. 19 is another example of a type based specification;

GLOSSARY

Figure 1:
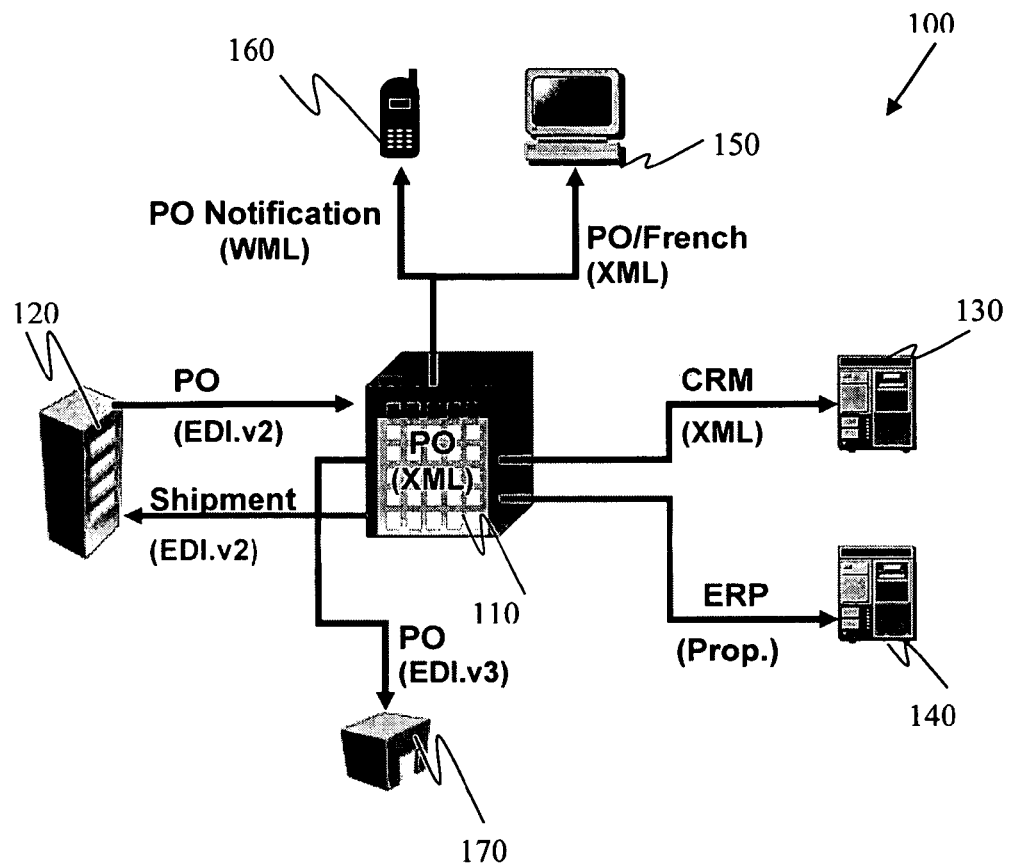
FIG. 1 is a schematic illustration of a typical commerce system.

Artificial vocabulary—a vocabulary including a set of terms defined to be used together, along with their associated definitions, designed for use in the automated exchange of data among machines. (Contrast natural vocabularies, which are intended for human communication.)

Concept—The building blocks for an Ontology. Concepts modeled include things, types of things, collection of things, roles of things. Types (or classes) include the definition of elements, which are either properties or parts of the type.

Dialects—Two vocabularies are said to be dialects of one another if they are based on the same ontology.

Document—A set of terms from an Ontology that constitutes a single message or document. This is a container class which is sufficiently important to warrant a first class definition.

meta-data—information about data, especially, but not limited to definitional information about data. This includes information that describes the type of data, describes an ontology or vocabulary, constrains the use of data, described relationships among data.

meta-model—Literally this refers to meta-data about a model. A meta-model is a description of a modeling methodology, such as Relational Data Modeling.

Ontology—A set of concepts being modeled and their interrelationships. An ontology is typically defined within the scope of a single community.

Ontology dictionary—a machine-processible definition of a ontology.

Source document—the document to be translated or transformed.

Target document—the document resulting from the execution of a transformation.

Terminology—a system or set of names or designations used in a particular science, discipline, or art and formally adopted or sanctioned by the usage of its practitioners" (from the online Merriam-Webster Unabridged Dictionary)

Tokenized—translated to a form where keywords have been replaced with numbers.

Transformation tool—A software tool used to assist in the specification and execution of a transformation. The use of such a tool typically involves a design phase, where the transformation to be performed is specified, and an execution phase (also called a runtime phase), where the transformations are automated using the specification generated during the design phase.

Unique—A term is unique for a concept, if it is the only term within a vocabulary to refer to that concept.

Vocabulary—A mapping of a terminology to an ontology. Specifically, a vocabulary maps the terms in a terminology to concepts in an ontology.

Vocabulary dictionary—a machine-processible definition of a vocabulary.

Vocabulary specification—A set of specifications that define either a document model or a data model. Examples include the specifications of X12 in EDI, the data dictionary describing a database schema for an ERP system, the XML DTDs for Rosettanet™.

DETAILED DESCRIPTION OF THE INVENTION

The preferred embodiment described below leverages the power of metadata in a unique way that solves the problem of complex configuration of data transformations. The preferred embodiment permits true automated integration by providing a complete semantic context to messaging systems and tools for leveraging that context. The preferred embodiment defines specialized relationships between message elements in various formats as well as transformation tools and algorithms to accomplish transformations between the messages based on the relationships.

As noted above, a vocabulary is a mapping of a terminology to an ontology. According to this definition, English and French are examples of vocabularies. These are examples of "natural vocabularies," which are used to facilitate communications among people. In contrast, "artificial vocabularies" are those that have been designed for use in automated processing. They include the major EDI standards, such as the X12 and the EDIFACT vocabulary. Other examples of artificial vocabularies include the common XML-based vocabularies, such as the RosettaNet™ vocabulary used in the high-tech manufacturing industry. The category of artificial vocabularies includes any set of data definitions that have been designed to work together. For example, the data schema for a large enterprise software application, such as an ERP application, a financial application, or a CRM application. The definition for these application-specific vocabularies may be in the form of a data dictionary as stored in a Relational Database Management System, or as set of vendor-specific specifications. For example, the popular ERP system by the vendor SAP™ defines a specification of set of documents, called IDOCs, used to communicate with the system. The IDOC specifications constitute an artificial vocabulary.

Artificial vocabularies tend to have more structure than their natural analogues. Typically, they have been designed with greater precision and less ambiguity than their natural counterparts. Also, they typically have been defined within a narrower context, for example, the EDI X12 vocabulary is limited to defining those terms that are used in common inter-company commerce in the United States. While this still embraces a large number of concepts, it excludes many terms that are present in a natural language such as English.

The preferred embodiment is concerned primarily with artificial vocabularies. With this understanding, any use of the terms "vocabulary" or "ontology" below has the implication that "artificial vocabulary" or "artificial ontology" is being referenced. However, the concepts, techniques, and mechanisms described herein may or may also be relevant to natural vocabularies.

The example described above with respect to FIG. 1 illustrates the complexity and volume of transformation issues. Compounding the problems of size are a number of real world issues associated with vocabularies and their specifications. These complexities contribute significantly to the complexity of transformation and to the difficult of designing transformation tools. Applicant has identified the following issues regarding the complexity of transformations and transformation tools.

Currently, there are a multitude of document/data models. Any document or data to be transformed is based on a model, whether implicitly or explicitly defined, of that part of the world that the data is attempting to describe. Such models might be based on well-defined modeling methodologies, such as object-oriented programming models or Relational Data Models, or XML-Schema models. However, it is equally likely that the document/data model is based on an informal and perhaps unspecified modeling methodology. The description of a modeling methodology is called a "meta-model," which literally means a "model or description of a modeling methodology."

Further, in addition to having many data models, there are many different languages to specify those data models. Some specification languages can handle several different types of data models, while others impose a particular data model. For example, the XML-Schema specification language can effectively model many different kinds of data models (i.e. many different meta-models).

One of the biggest sources of transformation problems is that the specification languages themselves are lacking by failing to incorporate all of the key concepts required to adequately enable a wide variety of transformations. Even common concepts like "type", which is well-known in programming languages and key in solving transformation problems (as described below), are often missing in the specification languages used to define commonly used vocabularies. For example, the popular XML-DTD specification language does not have an explicit notion of type, requiring the designer to re-specify the same type multiple times. These multiple specifications would often be variants of one another reflecting different levels of understanding at the time each specification was crafted.

Also, data may have different representations, also known as encodings or "formats." Some specifications dictate the representations in which the data may take, others do not. Specifications, even formal specifications, are often incomplete. For example, specifications may not fully describe underlying types in a vocabulary even though the underlying modeling methodology and specification language permit type definitions. In some cases, a formal specification is lacking altogether. In extreme cases, only samples of valid documents are known, with no description of the underlying vocabulary.

Additionally, specifications often declare the same concepts multiple times. For example, the address type may be declared multiple times under different names, and with no significant differences among the definitions. This may be due to lack of understanding on the part of the designer, lack of discipline on the part of the designer, or, as mentioned above, deficiencies in the specification language itself.

Specifications often confuse between roles and types. For example, is "Ship Address" a new type, or a role that an object of type "Address" may fulfill. There is no right or wrong answer to this problem, since it depends on modeling perspective and the model usage requirements. But many models will treat such differences inconsistently (e.g., in some documents, use Ship Address as a role based on an existing Address, while in others, define it as a new type; or define Ship Address as a type, but Bill To address as a role). Another problem is that a term may have different meanings in different contexts or different usages. For example, the term "state" may sometimes mean "status" and sometimes' mean "a state within a country."

In many cases the same term is used more than once with different meanings. This is called "overloading" and is common in object-oriented languages where operations like "add" is interpreted to mean different operations. depending on whether an integer is referenced or a vector is referenced. Overloading terms can result in ambiguity. An element may also be overloaded. For example, an attribute in a type may purposely be used in a way other than its specified use. For example, the "country" attribute in the address type may be used for conveying other information, such as routing information, for shipments strictly within the U.S.

The use of terms is often ambiguous, in both natural and artificial vocabularies. Artificial vocabularies, like natural vocabularies, are rife with "aliases" and "synonyms"—i.e., different labels for the same or similar. The use of names is often imprecise—a name may actually refer to a slightly different concept than the name implies. This often shows up as ambiguity in the use of the term.

The reasons for these shortcomings are many and occur at many different levels, as the above issues illustrate. Data models have shortcomings, and specification languages have shortcomings. This is in addition to the shortcomings that may be evident in a particular vocabulary or its specification. The specification of a vocabulary may be compromised in practice in order to overcome technical shortcomings, such as lack of network bandwidth. This is especially true for vocabularies defined prior to the 1990's, before the rise of public networks, such as the Internet, and before the dramatic increase in availability of low-cost network bandwidth. Also, vocabularies and their specifications are often designed by committees. As a result, they often contain compromises that reflect multiple viewpoints among different parties, and these viewpoints may not be consistent.

Finally, it is important to note that artificial vocabularies are living, evolving entities. As they evolve, they tend to accumulate ambiguities, imprecision, and other inconsistencies. As time progresses, more and more terms tend to become overloaded. Moreover, the concepts on which they are based evolve. However, the old specification for a prior version of a concept is rarely deleted because of the large investment in working implementations. Instead, a new specification for the refined concept is simply added to the specification. Both specifications, old and new, continue to exist. In this aspect, artificial vocabularies tend to resemble natural vocabularies. Evolution is purely accretive, without a pruning of out-dated concepts.

There are many different types of transformation, which vary greatly in complexity. "Format transformation" refers to transformation in which the representation of the source document or data is changed, but no changes are made in its semantics (where semantics is interpreted to broadly include the data model, the modeling methodology, the data type, and the terms used in its model). "Vocabulary transformation" is when the terms used to name the types and elements in a document or data record are changed but the underlying semantics of the types or elements are not. "Subset transformation" is when a subset of the data present in the source document is passed through to the target document. The format and semantics of the passed data is unchanged. "Semantic transformation" refers to transformation where the source document or data is transformed from one vocabulary to another vocabulary with a different underlying data model. A semantic transformation typical results in changes in type, structure, and semantics of the data. A subcategory of semantic transformation is where the source and target vocabularies are closely related. In the example of FIG. 1, the target vocabulary of EDI v.3 is a newer version of the source vocabulary EDI v.2. The changes between source and target tend to be less complex in such cases, as opposed to the general case.

A "process-driven transformation" is one in which, generally speaking, transformation is accomplished between different document types or data types within the same vocabulary. This is in contrast to semantic transformation, which transform among analogous documents or data types in different vocabularies. Whereas semantic transformation are typically used to communicate among different applications or partners, process-driven transformations are used to carry information forward from one process step to another. For example, transformation from an EDI purchase order to an EDI shipping manifest within the context of a business process, such as order fulfillment.

Different categories of transformation problems will encounter different transformation issues. For example, format translations are the simplest type of transformation and do not incur the issues associated with data models, terms, or specifications. Vocabulary transformations are simpler than semantic transformations. By clearly identifying the category of transformation, and building specialized tools for a particular transformation category, the preferred embodiment achieves an improved transformation tool and exploits the known relationship between the vocabularies.

Current transformation tools normally do not distinguish among these different kinds of transformations that are illustrated in FIG. 1. Current tools tend to treat all transformation problems as the most general "semantic transformation" problem, and tend to ignore the relationships that may exist between the source and target documents. Since semantic transformations between unrelated documents is the hardest kind of transformation to automate, such transformation tools require a lot of human effort in order to specific the transformation. Clearly, transformation tools that recognized the different kinds of transformations require, and therefore better automate the transformation design phase, offer clear advantages. Conventional transformation tools are generally unable to recognize that two different documents may be related and share semantically equivalent fields. Moreover conventional tools generally cannot identify and re-use transformation specifications among related documents.

Most transformation tools do not attempt to infer new transformation rules from already defined transformations. However, there are a few that do attempt such automated assistance, and these tend to be term-driven (or name-driven). Term-driven approaches can not handle the complexities of term ambiguity, overloading, and non-uniqueness. Overloading is very common in actual use, where a name or term is used for a purpose other than its original intent. For example, the term "state" might be overloaded to refer to "a large political subregion within a country, also known as a province" in some context, and refer to "the status of the process or object." A term-based transformation tool might then infer "status equals province" from the rules that "status equals state" and "state equals province." Overloading confuses transformation tools, leading to the incorrect inferences. Attempting to track down an incorrect reference often leads to a wild goose chase down paths that have no relation to the actual usage of the term in a particular context.

The preferred embodiment automates the specification of transformations to a high degree, including the automated inferencing of new transformations from already specified transformations, the recognition and re-use of the same transformation in different contexts (e.g., the same address transformation occurring in different documents). Further, the preferred embodiment provides a high degree of assistance provided to specification tasks performed by humans, especially when automated specification is not possible or is incomplete. For example, the preferred embodiment can present to a human specifier a list of candidate transformation alternatives (perhaps rated by likelihood) that may apply in a given context.

The preferred embodiment provides transformation mechanisms that either minimize the amount of meta-data required during execution or minimize the number of mechanisms required or minimize both. This is especially important when sharing documents among electronic partners that may not have access to the same level of meta-data or same level of mechanisms as the originating party.

Figure 2:
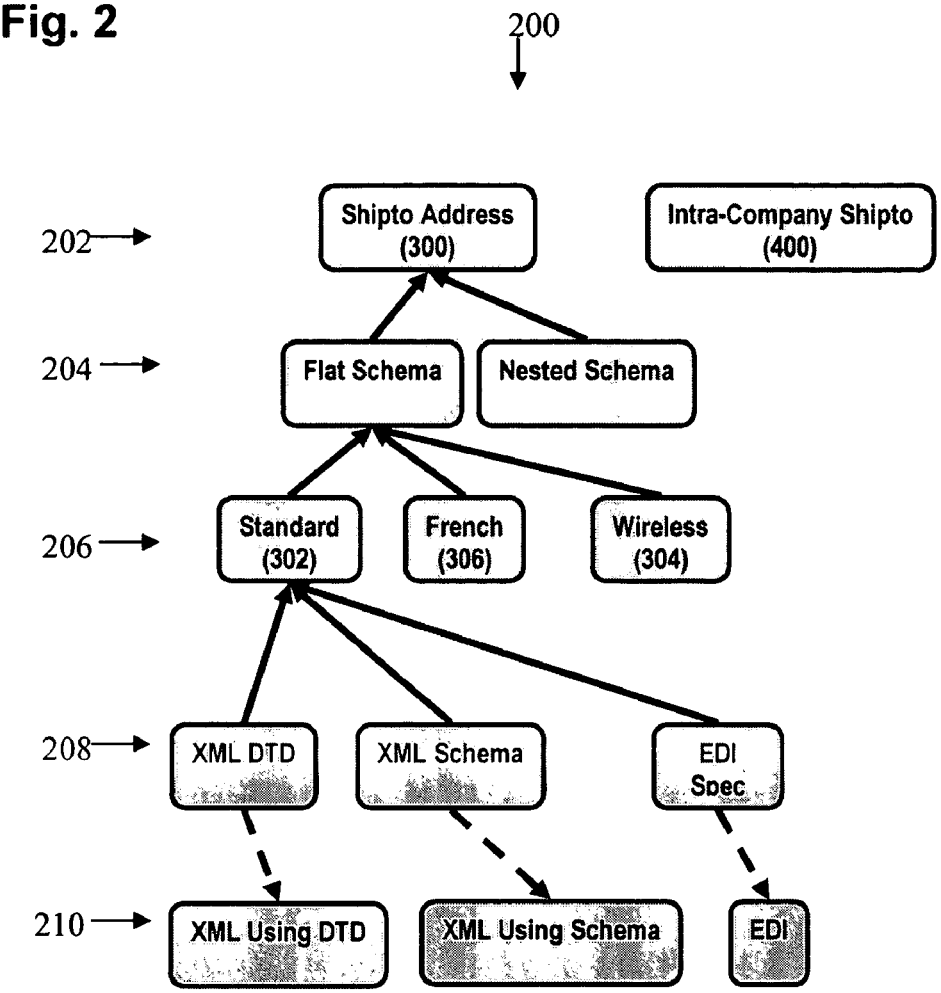
FIG. 2 is a schematic illustration of the framework of the preferred embodiment.

These and other advantages are achieved through a vocabulary based approach to data transformation. As illustrated in FIG. 2, the vocabulary-based approach of the preferred embodiment is based on framework 200 that separates the transformation problem into four distinct layers: 1) ontology layer 202 that defines the concepts, their semantics, and their structure of that part of the world that is being modeled; 2) vocabulary layer 206 that labels the concepts being modeled; 3) specification layer 208 that specifies (preferably in a machine-readable format) concepts, semantics, structure, and labels; and 4) representation layer 210 that represents (or encodes) data conforming to a specification. Note that ontology layer 202 can include derived ontology sublayer 204. Each layer is described in greater detail below.

Significantly framework 200 provides a clean separation of concerns—the separation of the representation of a concept, from the specification of a concept and, more importantly, the separation of the naming of the concept from the underlying concept itself. This separation of concerns allows the preferred embodiment to better isolate the aforementioned transformation issues and tackle these issues individually. Many transformation issues are relevant only to a single layer. This allows for a more modular design of transformation tools, and reduces the overall complexity of the problem.

Framework 200 separates the definition of things from the naming of things—ontologies define things, whereas vocabularies name things. This is a novel and very important aspect of the preferred embodiment. This is in contrast to conventional specifications and transformation tools where names and ontologies tend to be intertwined. In fact, ontologies are not explicitly modeled in most specifications and are not used in conventional transformation tools. Instead, names are often the only, clues in the specification as to the true intended meaning of the associated concept. But there are many transformation issues with using names, as described above. These issues include ambiguous terms, overloaded terms, and non-unique terms. This separation of naming and meaning, and the explicit modeling of both, is crucial for avoiding the pitfalls in current automated design tools.

FIG. 3 and FIG. 4 illustrate examples of ontologies, for two related concepts, of the preferred embodiment which are based on the following meta-model. All elements in this meta-model are considered to be "first-class," that is, they are explicitly modeled and can occur independent of other elements. Ontology 300 of FIG. 3 is an ontology for a "Ship to" address with a flat schema. Ontology 400 of FIG. 4 is an ontology for an intra company "ship to" address. Note that each element has a corresponding unique concept ID. The significance of the concept ID will become apparent below.

Element—a basic building block. It describes a property of a type or thing, or a role that a type or thing may assume. In fact, the meta-model explicitly allow for an element to be classified as a property or role.

Type—a type is composed of elements and constraints over the elements. Type being used in the same sense here as in standard modeling and programming paradigms.

Distinguished things or "objects".

Distinguished collections of things (may be typed or not).

Documents—which are composed of types, elements, distinguished things and collections. The meta-model considers documents to be ad-hoc or anonymous types, with each document being a distinct anonymous type.

As an example, a PurchaseOrder document is composed of a number of distinguished things including several Address objects. One of these objects serves the role of a Billing Address and the other serves the role of a Shipping Address. These are examples of element definitions. The Address object can be further constrained as a continental US address this is an example of a type definition constraining an object. Alternatively the meta-model allows the constraint to be placed on the specific role—the Shipping Address element can be constrained as a continental US Shipping Address type. If the PurchaseOrder contains one or more shipping addresses as in the case of multiple items in the same order, these may be represented as a collection of ShippingAddresses, and may be named or unnamed. This is an example of a typed collection within the PurchaseOrder document.

Figure 5:
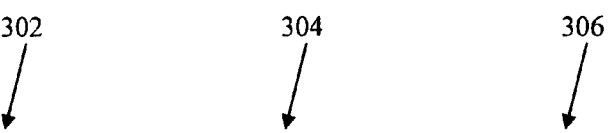
FIG. 5 is an example of human readable representations of vocabularies.

The above meta-model is rich enough to capture the concepts being described in most programming and modeling methodologies. In particular, it is rich enough and closely aligned with the meta-model used in XML-schema. The meta-model is also rich enough to be able to model important meta-information that can assist in overcoming the transformation issues previously described. FIG. 5 illustrates vocabularies 302, 304 and 306 corresponding to ontology 300. Note that each element has a unique ID.

Ontologies are often implied and not explicitly specified in a vocabulary specification. At best, the underlying ontology is only partially specified. As a consequence, the same vocabulary specification can support many compatible ontologies. To support a given vocabulary or vocabulary specification, it is desirable that an ontology is complete and minimal. An ontology is "complete" if every relevant concept is represented. Completeness can not be computational verified, but common forms of incompleteness are easy to check, such as verifying that all elements or all named types in a specification are explicitly modeled in the ontology.

An ontology is "minimal" if every relevant concept is expressed exactly once. Hence, the ontology contains no redundant concepts. Redundant concepts can be introduced into an ontology through many means, but one common means is when the same concept is referred to by many different names within a vocabulary specification (which is a common practice). Often this requires human assistance to decide if two terms refer to the same concept. As noted above, in the preferred embodiment, each concept is assigned a unique identifier, known as a concept-id, that is immutable over time. This identifier can be a large number or a string of characters. It need not be mnemonic, but could be. It could be a preferred term for the concept as long as the term obeys the uniqueness and immutability requirements.

A vocabulary relates a set of terms to their underlying meanings, as expressed in an ontology. The set of terms associated with a vocabulary is called a "terminology." Because of term ambiguity and overloading, the number of terms in a terminology is typically far less than the number of distinct concepts in the ontology. Within a given vocabulary and its associated ontology, a term is said to be "unambiguous" if it refers to at most one concept. If a term can reference more than one concept, then it is said to be "overloaded." A term is said to be "unique" for a concept, if it is the only term within a vocabulary to refer to that concept. Almost all real-world vocabularies have overloaded and non-unique terms. This is not necessarily bad, because without overloading and redundant use of terms, many terminologies would grow to be unwieldy in size and become significantly less intuitive. However, terminology ambiguity and nonuniqueness pose many problems for automated transformations, especially ones relying primarily on terminology and type information.

Acknowledging that terminology ambiguity and non-uniqueness is a fact of real-world data, and may in fact be desirable to a certain extent, framework 200 provides methods to resolve ambiguity and nonuniqueness in terminology. A vocabulary is more than a simple association of terms to concepts. Vocabularies define both a forward map that given a term in a given context determines that appropriate concept, and an inverse map that given a concept and a given context assigns the appropriate term. Mapping from term to concept is called "resolution," and it is more than a just function of the term being mapped, but also may include the context in which the term is used. Specifically, resolution may make use definitional information (i.e., meta-information) from the vocabulary, structural information from the source document, actual data from the source document, historical information gathered from previous transformations, and any other information available at design time or run-time. A convenient method of specifying the forward or resolution map is through a set of resolution rules, with each rule being based on a term and relevant contextual information. The unique IDs can be used to accomplish mapping.

Similarly, the reverse map, that is mapping from concept to term, is called "naming." Similarly, naming is not just a function of the concept, but also of the context in which the assigned term will appear. As with resolution, naming can be specified through a set of naming rules. Also, as with resolution, these rules may refer to any contextual information available at design time or at runtime.

Figure 9:
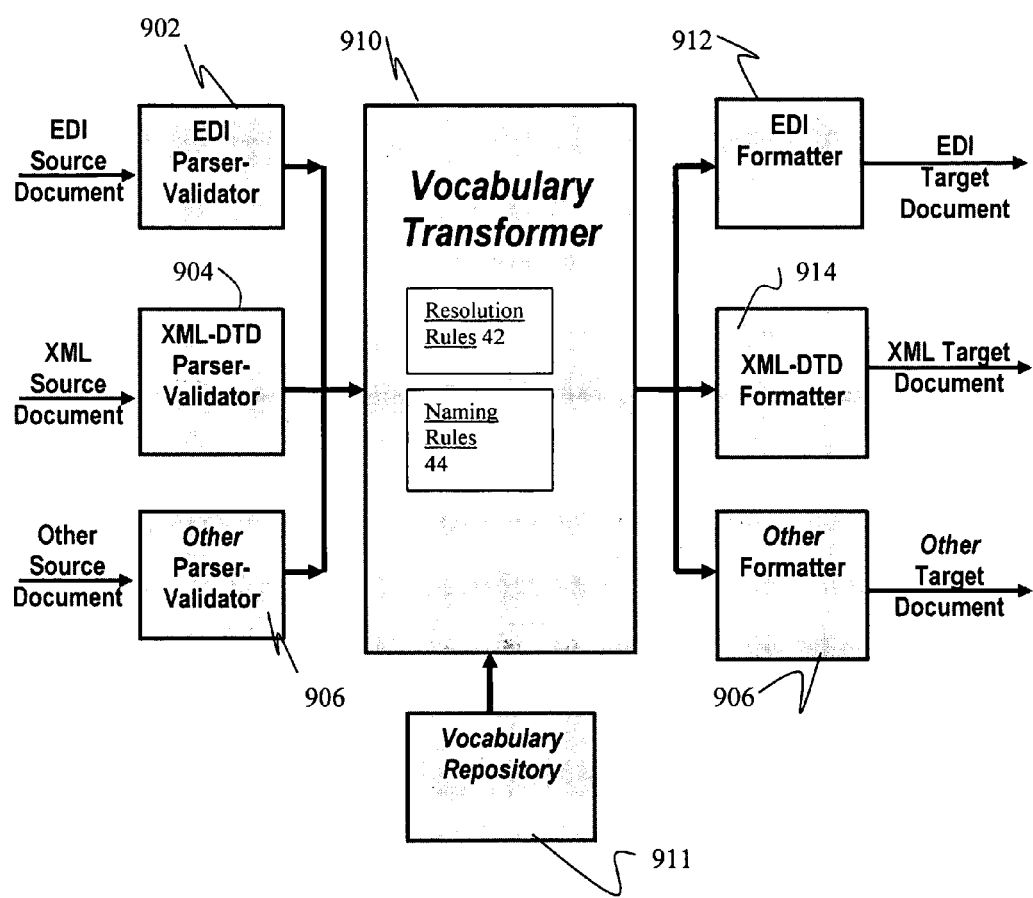
FIG. 9 is a schematic representation of a runtime system for transformation in accordance with the preferred embodiment.

As illustrated in FIG. 9, vocabularies 910 can be more formally defined in the preferred embodiment as a set of resolution rules 42 to assist in the forward mapping from an associated terminology and ontology, and a set of naming rules 44 to assist in the inverse mapping. A vocabulary is said be "unambiguous" if each term within its associated terminology will be resolved to at most one concept in its associated ontology over all valid source documents and valid contexts. Similarly, a vocabulary is said to be "consistent" if each concept in its ontology will be mapped (i.e., named) to at least one term in a valid target document, when presented with a valid source document within a valid context. A vocabulary is said to be "well-formed" if it is unambiguous and consistent. A vocabulary is said to be "complete" if every term has at least one associated concept and every concept has at least one associated term.

Well-formness and completeness are highly desirable traits for a vocabulary, but few real-world vocabularies are specified in such a way that they are well-formed. Although, well-formness can not be verified in an automated fashion, many forms of ambiguity and inconsistency can be detected automatically. Hence, as we design a vocabulary, we can verify it against detectable ambiguities and inconsistencies, and ensure that the vocabulary is not known to be ill-formed.

Two distinct vocabularies can use the same ontology. Specifically, the two vocabularies can map two distinct terminologies to the same ontology, thereby different names to the same concepts. For example, as illustrated in FIG. 5, one terminology could comprise English (Vocabulary 302) terms, while the other could comprise the equivalent French terms (Vocabulary 306). Two vocabularies are said to be dialects of one another if they are based on the same ontology.

Framework 200 can leverage a wide variety of existing specification languages and data representations. Specification languages as diverse as EDI, XML-Schema, XML-DTD, Java, CORBA-IDL can be accommodated. This is important to ensure wide applicability of framework 200 and the vocabulary-based approach thereof. The vocabulary-based approach encourages, but does not require, the separation of specification and representation. However, most specification languages impose a particular representation. This is acceptable and can be easily accommodated.

Framework 200 includes three key aspects. First, framework 200 includes the separation of concerns with regard to vocabularies and transformations. In particular, the vocabulary based approach thereof calls for the separation of the representation of a concept in ontology layer 202, from the specification of a concept in specification layer 208. Also, framework 200 provides separation of the naming of the concept in vocabulary layer 206 from the underlying concept itself as defined in ontology layer 202. Framework 200 includes the explicit and formal modeling of the ontology underlying a vocabulary in ontology layer 202 and includes the formal definition of a vocabulary in vocabulary layer 206 as a mapping from terminology to ontology.

The separation of concepts from the terms used to name those concepts provides several key advantages. One key advantage is that transformation tools can now be designed that avoid the pitfalls with most terminologies, including ambiguity and nonuniqueness. Another key advantage is the ability to support multiple terminologies for the same set of concepts, such as a English terminology, a French terminology, and a wireless terminology.

The first step in enabling a vocabulary-based transformation is to construct a machine processible definition of the vocabularies and ontologies involved. A machine processible definition of a vocabulary is called a "vocabulary dictionary," and a machine processible definition of an ontology is called an "ontology dictionary." This is accomplished by reading the machine-readable specifications of the vocabulary and ontology. This is likely to result in a partial definition of the source vocabulary and ontology, at best, because of the limitations of current specifications. This partial definition will need to be augmented, typically in human-assisted fashion, to arrive at a complete definition.

The steps involved in constructing the vocabulary and ontology dictionaries depend on the kind, quality, and format of the specifications available. At one extreme, the available specifications may be in an informal and non-machine readable format. In this case, constructing the initial vocabulary and ontology dictionaries is largely a manual exercise. The more interesting cases occur when the specifications are in machine readable formats.

Figure 6:
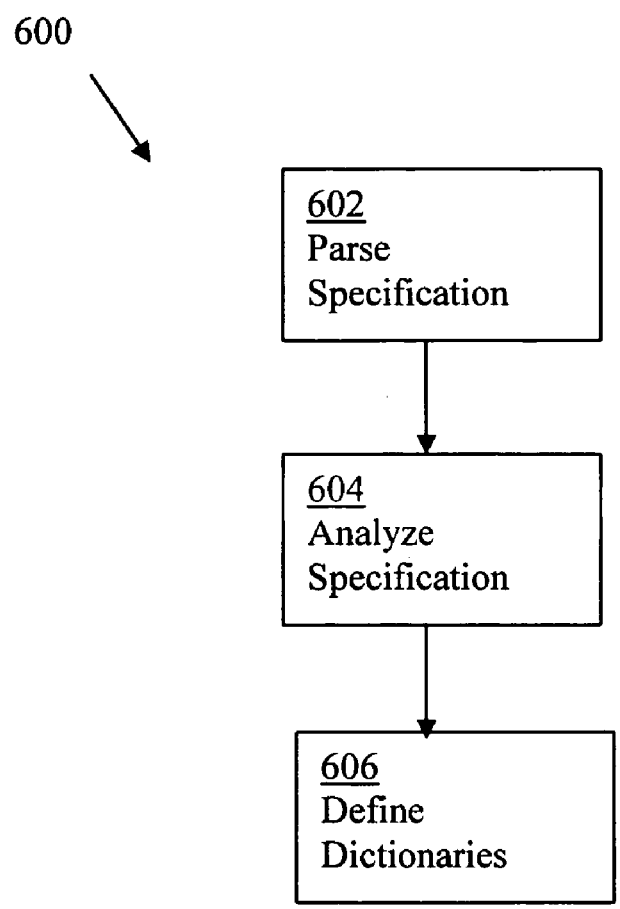
FIG. 6 is a flow chart of a method for creating an ontology.

In general, constructing the vocabulary definition and its associated ontology dictionaries for a given vocabulary consists of the steps illustrated in FIG. 6. Specifically, process 600 includes step 602 in which the machine readable specification for the vocabulary is parsed. In step 604, the specification is analyzed to derive an initial vocabulary dictionary and an initial ontology dictionary. This analysis is specific to the kind of specification available. In step 606 the initial vocabulary and ontology dictionaries are defined through further analysis. This analysis works off the existing vocabulary and ontology dictionaries and generally speaking; this analysis is not specific to the format of the original specifications. These steps are described in greater detail below.

The goal of steps 602 and 604 is to produce the best initial vocabulary dictionary and ontology dictionary. This depends very much on the format, style, and quality of specifications available. As discussed above, specifications come in a wide variety of formats, ranging from formal, machine-readable specifications to informal, text-oriented specifications which are not machine-readable. Examples of formal specifications include XML DTD's (see FIG. 10), XML Schema (see FIG. 11), Data Dictionaries in Relational Database Systems, the Data Dictionaries maintained by some software applications. EDI specifications also come in a machine-readable format (see FIG. 12). With such cases, the initial vocabulary and ontology dictionary can be constructed in an automated fashion. Other specifications are not machine readable or only partially expressed in a machine readable fashion. In such cases, a human expert must enter all or part of the specification in through "editing programs." FIGS. 13 and 14 respectively illustrate specific instances of documents corresponding to the specifications of FIGS. 10 and 12.

The style of the specification is another important factor in producing suitable vocabulary and ontology dictionaries. Common specification styles include component-structured specifications, type-structured specifications, and schema-structured specifications. These different styles vary greatly in the amount of vocabulary and ontology information contained the specifications. A specification format may or may not dictate a specification style and, in fact, the most popular XML specification formats (specifically, XML-DTDs and XML-Schema) can accommodate a wide variety of specification styles, including all of the three named styles. These styles are discussed in more detail below with respect to the example of the Purchase Order described in FIG. 15.

The quality of specification is perhaps the most important factor, and this is largely independent of specification format and specification style. Any specification in any specification language can have overloaded terms and redundant concepts. Specifications may also be incomplete, in that many of the concepts are not explicitly specified. Despite the weakness of any particular specification, it may still be possible to design a well-formed vocabulary. Since the style of specification typically has the greatest impact on the completeness of the initial vocabulary dictionary and ontology dictionary, we consider below each major style separate. These styles appear to cover the majority of uses today.

Component-structured specifications, as illustrated in FIG. 16, follow a meta-model similar to the meta-model defined for the preferred embodiment herein. Specifically, the specifications define a set of elements which then become common building blocks for type and document definitions. The EDI and EBXML standards follow this approach. Each element, type, and document definition is referred to as a "component" herein. The Example of FIG. 16 uses concept ID attributes to distinguish components. Component-structured specifications are well suited to a vocabulary-based approach. Typically, each component can be correlated to a distinct concept. Although the specifications do not explicitly separate terms and concepts, it is typically relatively straightforward to do so. In process 600 each component is assigned a in step 604 which allows it to be referred independent of a term from a particular vocabulary. FIG. 17 illustrates another example of a component based specification expressed with XML schema. Note that each type has a predefined ID that maps directly to the concept represented by that element.

Type-structured specifications follow a different meta-model where types are considered the fundamental building blocks and where elements (usually called "attributes" in this meta-model) are not defined independently from a type. Elements, therefore do not appear as separate, re-usable building blocks. This is the meta-model used by most programming languages, many software applications, and some database systems. The naming of elements within each type is, therefore, ad-hoc. Two types using the same concept as element may call their respective elements by different names. Moreover, there is no way to represent the fact that two elements occurring in two distinct types relate to the same concept. FIG. 18 illustrates a type based specification using XML Schema. FIG. 19 shows a type based specification with a flat structure.

Because of the differences in meta-models between type-structure specifications and ontologies, capturing the specification into the ontology dictionary poses some challenges. Types are, of course, are explicitly specified and thus are easy to capture into the ontology dictionary—each type is parsed in step 602 and becomes a separate type concept in the ontology. The straightforward way to capture element specifications is to consider each element in a type as a separate concept in step 604, and store it as such into the ontology dictionary. This results in a large amount of concept redundancy, sometimes by a factor of ten, but some of this redundancy can be removed during subsequent refinement step 606, to be discussed below in greater detail.

A schema-structured specification follows a different meta-model furthest from the ontology meta-model. Schema-structured specifications use neither types nor elements as building blocks. In essence, every data schema or document schema is starts from scratch in building out its structure. This is the meta-model used by Relational Database Systems, and by many software applications. Since there are not re-usable components, each structure that would normally represent a type must be specified in all places that structure is to be used. Each structure declaration is ad-hoc and subject to variation even when the intention is that the structure represents the same type as used in other structure. Each element specification is also ad-hoc.

The straightforward way to capture schema-structure specification is to consider each structure as a separate type concept in the ontology and every element specification as a separate element concept in the ontology dictionary. This results in the most concept redundancy of any approach, but again, much of this redundancy can be removed during subsequent refinement steps.

The initial vocabulary and ontology dictionaries, built from the specifications in steps 602 and 604, are likely to be redundant. This is true even if a component-structure specification because of the quality of the specifications. No specification is perfect, and some specifications may be poor even if a good specification style is used. The above discussion on the different specification styles have already discussed how redundancy is introduced into the ontology. The initial vocabulary and ontology dictionaries will be complete, in the sense that all concepts are represented, as long as the vocabulary specifications are complete.

Figure 7:
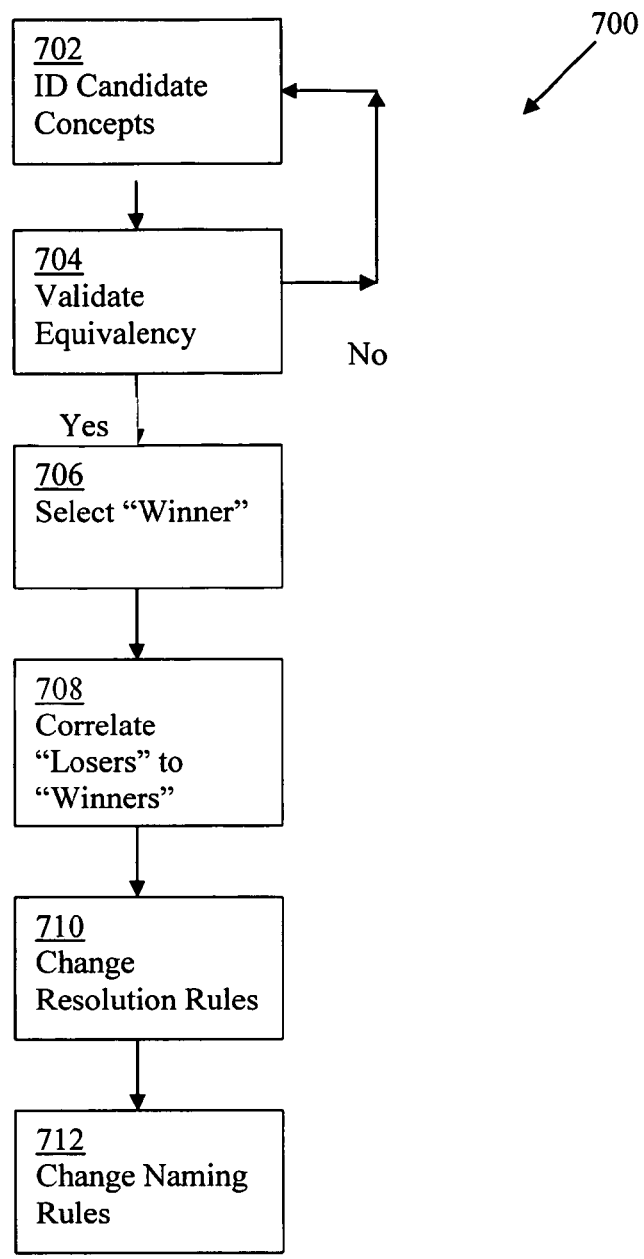
FIG. 7 is a flow chart of the defining step of FIG. 6.

Concept redundancy can be removed in step 606 by analyzing the ontology dictionary and identifying equivalent concepts, then choosing one of the concepts as the "winner", and then updating the ontology dictionary to reflect the winner. This analysis and update can be performed incrementally over a period of time. The algorithm 700 illustrated in FIG. 7 and described below accomplishes this and can be incorporated into step 606 of FIG. 6. Note that this algorithm incrementally finds two or more equivalent concepts in the Ontology Dictionary for a given vocabulary, and then merges the equivalent concepts into one. In step 702, two or more candidate concepts which appear to be equivalent are identified. Such candidate concepts can be identified, for example, by searching for elements with the same or similar names and the same or similar types. Candidate types can be identified by searching for structures with equivalent or similar elements. In step 704 a human or automated vocabulary designer validates whether the candidates are indeed equivalent. If so, the process proceeds to step 706. In not, the candidates are not equivalent and the process returns to step 702. In step 706, one of the equivalent candidates is selected as the "winner." Each of the other candidates are marked in the ontology dictionary, and replaced with, or otherwise correlated to, the winner in step 708. In step 710, all resolution rules in the vocabulary dictionary are changed to resolve to the winner candidate. In step 712, the naming rules for each losing candidate are copied and changed to refer to the winner instead. The original naming rules are retained so that a reference to a loser can still be correctly named.

Transformation algorithms, as described in the next section, use concepts to assist in the transformation and may store the concept-id of a concept within a document to assist in a future transformation. By keeping a loser's concept-id and naming rules intact, future transformations can still correctly name the concept. The above algorithm can be run at any time, and can be run multiple times without compromising the correctness of ongoing transformations.

Figure 8:
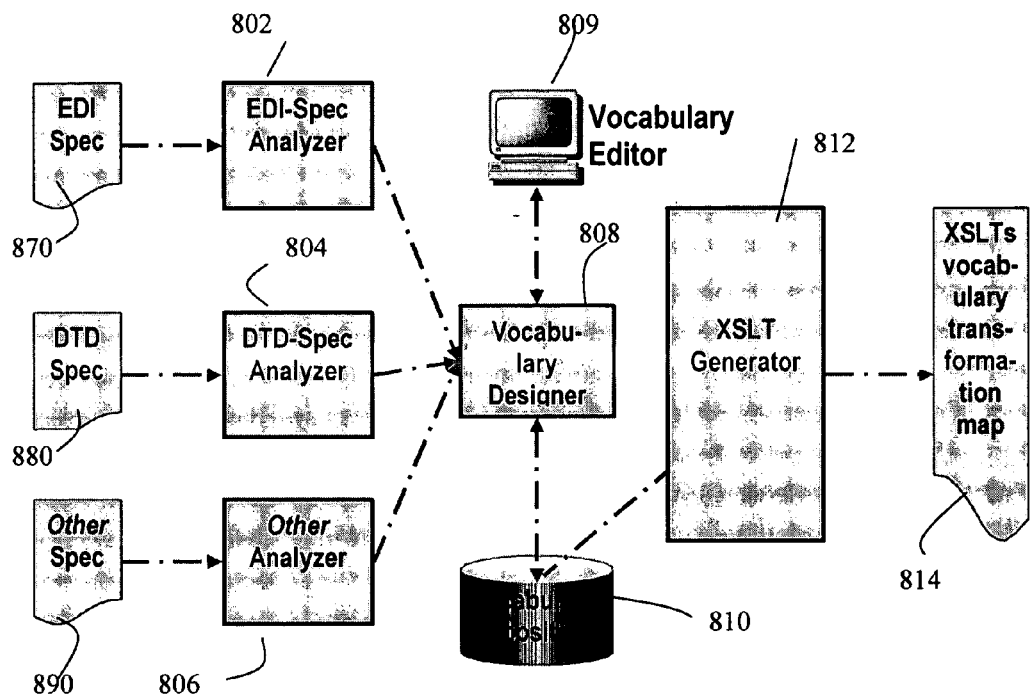
FIG. 8 is a schematic representation of a vocabulary creation system.

FIG. 8 illustrates an architecture for creating vocabulary dictionaries and ontology dictionaries in accordance with the preferred embodiment. Architecture 800 analyzes the document specifications for the vocabularies of interest, builds the corresponding vocabulary and ontology dictionaries, and stores and manages the dictionaries in repository 804. This architecture makes use of algorithms for constructing dictionaries described above. A Specification Analyzer (spec analyzer) performs the functions of reading and parsing the specification for a vocabulary such as EDI spec 870, DTD spec 880, and other spec 890 and generating the initial vocabulary and ontology dictionaries, as described in Steps 602 and 604 of FIG. 6. The architecture shows a separate Spec Analyzer for each specification language used; hence, EDI Spec Analyzer 802 is used for EDI specifications, and DTD Spec Analyzer 804 is used for XML-DTD specifications. Each spec analyzer can handle all specification styles supported by its specification language. The architecture allows for new spec analyzers 806 to be added incrementally. The spec analyzers pass the initial vocabulary and ontology dictionaries to vocabulary designer 808.

Vocabulary designer 808 is responsible for storing the initial dictionaries into the Vocabulary Repository 810 and refining the dictionaries (step 606 of FIG. 6). For refinement, the Vocabulary Designer 808 can use a number of refinement algorithms, such as the one described above with respect to FIG. 9. This algorithm and possibly others require human designer to validate recommendations or to choose among alternatives. Vocabulary designer 808 invokes vocabulary editor 809 for all interactions with human designers.

Vocabulary repository 810 is responsible for storing the documents and other common repository functions, such as maintaining multiple versions, archiving, and backup. It provides access of the dictionary information to a wide variety of other programs. Vocabulary editor 809 provides the primary user interface for human designers to view and edit the dictionaries. It provides the following functions. It allows the entry of a dictionary from scratch. It allows the editing of an existing dictionary. It provides feedback from automated refinement algorithms executed by the vocabulary designer 808, allowing users to validate recommendation, make new recommendations, and the like. XSLT generator 812 is an optional component. Unlike the other components, it is not concerned with the capture or refinement of the dictionaries. Instead, from a given source vocabulary, target vocabulary, and the associated ontology dictionary, it can generate a pre-packaged vocabulary transformation map 814 based on the standard transformation language known as XSLT.

There can be many modifications to the preferred embodiment. For example, the spec analyzers need not be specialized to a single specification language. Instead, a spec analyzer could be designed to handle multiple specification languages. Also, one may want to componentized spec analyzers not by specification language, but instead by specification style. The functions among the components could be combined into fewer components or broken out among more components. At the extreme, all of the functions could be combined into a single component providing reading, analyzing, dictionary construction, and dictionary refinement. The vocabulary and ontology dictionaries could be made available in any number of formats and access methods and need not be stored in a vocabulary repository. For example, the dictionaries could be stored directly in the file system and directly accessed as files by the other components. In such architecture, a vocabulary repository is not needed. An XSLT generator is an optional component. Also, more such generators could be added incrementally, without affecting the function of the other components. Finally, any of the aforementioned components or functions could be implemented in any combination of hardware and/or software.

Vocabulary Transformations are an important category of transformations. They occur frequently in practice, as illustrated in FIG. 1. Framework 200 greatly facilitates this category of transformation. One important aspect of vocabulary-based approach to vocabulary transformation is that vocabularies are related through their mapping to a common ontology. This is in contrast to the conventional approach, which is to map the terms in the vocabularies directly to one another. Hence, in conventional approaches, it is common to map the term "state" in the English vocabulary directly to the term "province" in the French vocabulary. Instead, in the vocabulary-based approach, the English term "state" is first mapped to the concept of "largest, political subregion within a country" in the associated ontology, and then this concept is mapped to the French term "province." This avoids the problems associated with the ambiguities, imprecision, and overloading that often occur in real-world vocabularies. For example, if the term "state" is overloaded with the concept of "status", then our approach avoids erroneously mapping "state" to "province" in those contexts where "state" is being used to mean "status." Approaches that directly map terms can not easily handle the two different meanings (and hence two different mappings) of "state."

In the general case, it is presumed that the vocabulary dictionary and the ontology dictionary for both the source and target vocabularies have already been built, as described above. It is further presumed that both the source and target dictionaries are available throughout the transformation process. This is the typical case for a transformation occurring within a single location or company. In this case, if both vocabularies are complete, then the dictionaries contain sufficient information to infer the mapping from the source vocabulary to the target vocabulary. No additional information needs to be added, and the map need not be computed ahead of time and stored. Mapping a document consists of the steps described below.

A very important property of the general algorithm is that it works equally well for minimal ontologies and redundant ontologies. It tolerates redundancy in concepts and despite such redundancies, it always produces correct results. As described above, some specification languages can result in very redundant ontologies. Such ontologies do not impair this algorithm.

FIG. 9 illustrates an architecture 900 for transformation in accordance with the preferred embodiment. The source document, such as an EDI source document, flows into the parser-validator appropriate to its format. For example, an XML source document would flow into the XML parser-validator 904. The ability to recognize the format of a document is possible through many well known means. Parser-Validator 904 is a software component that parses the source document, validates correctness, converts the document to a canonical format and then passes the converted document to vocabulary transformer 910. Depending on the format of the source document and the kind of specification, the parser-validator may or may not need the original document specifications in order to parse and validate the document. For most formats, including EDI and XML, the parser-validator will need the specifications. Three parser-validators 902, 904, and 906 are shown, but many more could be added. Parser-validator 906 can be for any specification language and document format that is desired.

Vocabulary transformer 910 receives the parsed source document and executes the algorithm for vocabulary transformation, as described above. To do so, vocabulary transformer 910 accesses the vocabulary dictionaries and the shared ontology dictionary for the source and target vocabularies in the manner described above. Vocabulary transformer 910 reads these dictionaries from vocabulary repository 911 (could be the same device as Vocabulary repository 810), which is responsible for storing and managing the dictionaries. By executing the algorithm, vocabulary transformer 910 transforms the source document to a target document in the canonical format, and then passes the newly created target document to the appropriate formatter 912, 914, 916, for final conversion to the target format. For example, if the final format was XML based on an XML-DTD specification, then the vocabulary transformer 910 would pass the target document to the XML-DTD formatter 914.

The formatter performs the opposite function of the parser-validator—it converts the target document from the canonical format to the desired target format, based on the target specification. Depending on the format of the target document and the kind of specification, the formatter may or may not need the original document specifications in order to format the target document. For most formats, including EDI and XML, the Formatter will need the specifications. There many alternative embodiments to the one depicted offering similar advantages. For example, the parser-validator need not be specialized to a single specification language. Instead, a parser-validator may handle multiple specification languages. Similarly a parse-validator need not produce a single canonical representation of the source document, but may produce several alternative formats. An alternative architecture is to have multiple vocabulary transformers, one for each specification language, and in this case, the parser-validator need not convert the format of the source document. A similar set of architectural options exists for the formatter. Specifically, a formatter could handle multiple specification languages.

Various modifications can be made to the preferred embodiment. The functions among the components could be combined into fewer components or broken out among more components. For example, the parser-validator could easily broken into two components, one for parsing and one for validating. At the other extreme, all of the functions could be combined into a single component providing all functions, including parsing, validating, transforming, and formatting. In this case, an intermediate canonical format for source or target document would not be required. The vocabulary and ontology dictionaries could be made available in any number of formats and access methods. For example, the dictionaries could be stored directly in the file system and directly accessed as files by the vocabulary transformer. In this architecture, the vocabulary repository is not needed as a component. Finally, any of the aforementioned components or functions could be implemented in any combination of hardware and/or software.

Some of the most interesting cases for vocabulary transformations occur when documents are being passed from one execution environment to another. This often occurs when documents are being passed from one company to a partner company. The originating company may process documents in one vocabulary, while the partner or recipient company may process documents in a different vocabulary. A similar situation may occur between two devices, say a desktop computer and an attached PDA, or a host computer and a wireless device. In these cases, it may not be desirable or possible to have both source and target vocabularies defined in both environments. This section examines various scenarios where we attempt to minimize the information requirements at one environment or the other, or attempt to minimize the amount of meta-data contained in the documents that are passed among the environments.

Scenario 1—Both Partners have all Vocabulary and Ontology Dictionaries

This scenario requires that each partner has all relevant dictionaries. In this respect, it is no different than the general case scenario and the same algorithms and mechanisms can be used. This offers the most flexibility, but requires that each partner has all relevant dictionaries. Transformations can take place at either partner—i.e., the originating partner can transform the document to target vocabulary before sending, or alternatively, the originating partner can send the original source document, and the recipient can perform the transformation.

This scenario may not be practical in many cases. If the companies have a lot of partners supporting many different vocabularies, then this scenario requires that each partner maintain the relevant dictionaries for all vocabularies. For N partners with M vocabularies, this requires each partner to maintain M dictionaries, with a total of N*M dictionaries across all partners. Each partner has a burdensome task even when M is relatively small. Because of this, approaches requiring fewer dictionaries are often more attractive.

Scenario 2—Partner Communication Through a Common Vocabulary

An alternative approach for enabling a large community of partners to communicate using a number of different vocabularies is to choose a single vocabulary in a common format as the basis for communication. Each originating partner transforms to the intermediate vocabulary before sending a document, and each recipient partner transforms from the intermediate vocabulary upon receipt of a document. Each partner now need only maintain two vocabularies, its desired vocabulary and the intermediate vocabulary.

The intermediate vocabulary can be one of the partner vocabularies, but it need not. In fact, the intermediate vocabulary can be one that is fabricated specifically for this purpose. A easy way to fabricate the intermediate vocabulary is to choose the concept-ids associated with the shared ontology as the terminology for the intermediate vocabulary. Since the concept-ids are unambiguous and unique, the mapping to and from the intermediate terminology and the ontology is trivial. In this case, the Vocabulary Transformer can be easily modified to recognize this case and perform the trivial mapping without having to maintain a separate vocabulary dictionary. Therefore, each partner effectively needs only to maintain a single vocabulary dictionary. Note that this requires that each partner maintain use the same concept-ids in their ontology dictionaries. This is not required in the general case described in the previous scenario.

An intermediate vocabulary, where concepts and terms have a 1-to-1 mapping, is referred to as a "normalized vocabulary" for the given ontology. The concept-ids associated with an ontology can serve as the terminology for the normalized vocabulary. This requires that specification languages and representation formats for the normalized vocabulary be able to support the format of concept-ids used in the ontology dictionary. However, the format of these concept-ids can be easily chosen to support the desired specification languages and representation formats. Normalized vocabularies are very useful in practice.

Scenario 3—Partner Communication Using Meta-Data Enrichment

Meta-data enrichment is an alternative approach to using a normalized vocabulary for exchanging documents between partners with different vocabulary dialects. In this approach, the original source documents are not transformed into a normalized vocabulary. Instead the source documents are augmented (or "enriched") with additional metadata to ensure the recipient can process them. The minimal amount of meta-data is to add the concept-id to each element. Once added, the documents are sent to recipient.

Meta-data enrichment requires that the recipient be able to parse the source document (but it need not be able to map the source vocabulary or maintain vocabulary dictionaries for it). This approach also requires that the document format permit the addition of meta-data without compromising the integrity of the data in the document. Most XML-based specifications and XML representations permit this. Specifically, a best practice approach to XML-DTD specifications or XML-Schema specifications will permit this.

Meta-data enrichment also requires an enhancement to the Vocabulary Transformer. Specifically, the Vocabulary Transformer must use the concept-ids present in the meta-data of the source document to resolve the concept. (The Transformer can simply ignore the source terminology.) This is straightforward because the concept-ids are already maintained in the ontology dictionary. With these enhancements, a recipient can use the architecture of FIG. 20 to process shared documents. However, the recipient need not maintain the vocabulary dictionaries for the source documents it expects to receive.

Figure 20:
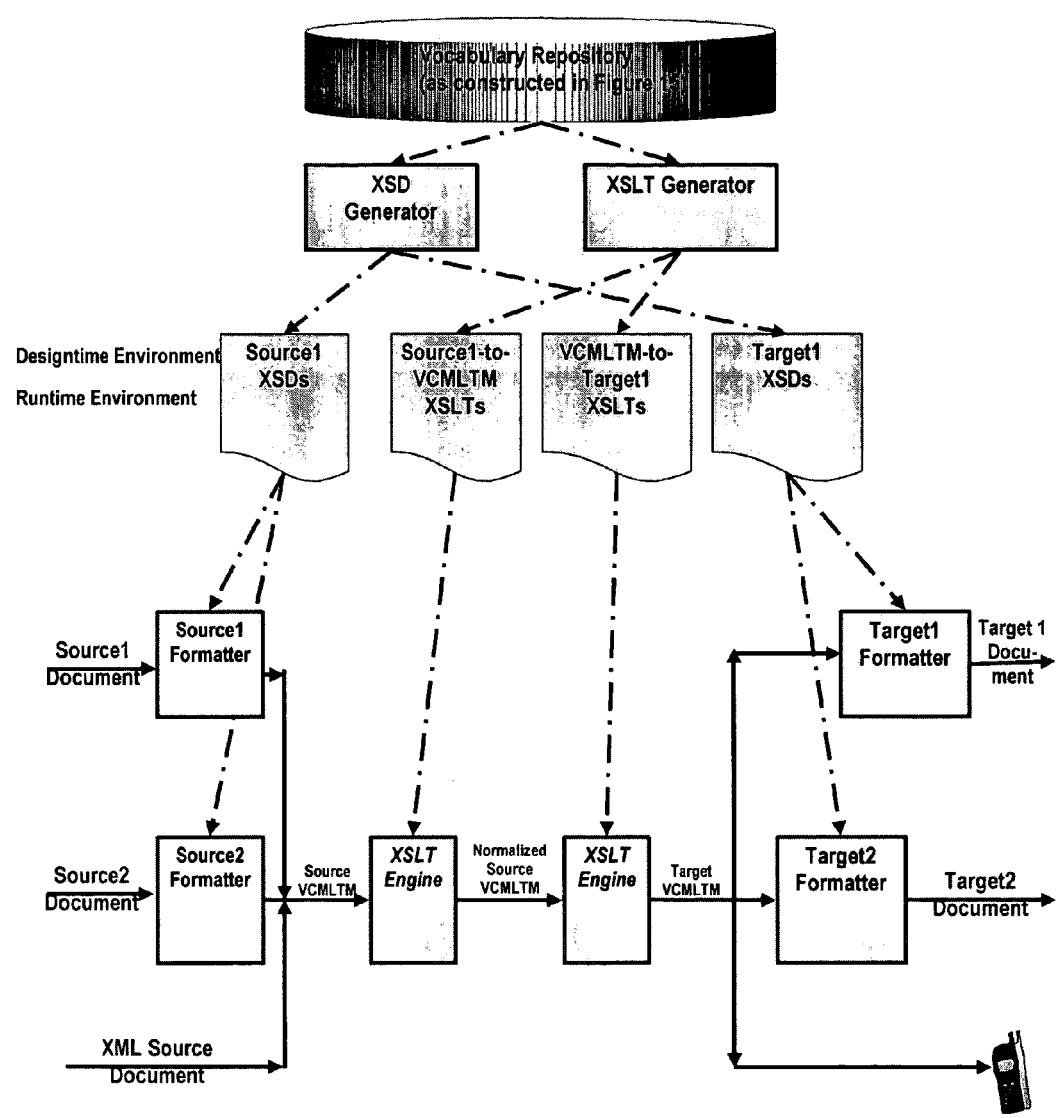
FIG. 20 is a schematic illustration of an XML based architecture for transformation in accordance with a preferred embodiment.

FIG. 20 presents XML-based architecture for Vocabulary Transformation and the sharing of documents between partners. This architecture uses the techniques of Normalized Vocabularies and Meta-data Enrichment (described in the previous two scenarios) for supporting multiple partners using a variety of different vocabulary dialects of the same ontology. XML is rapidly becoming a ubiquitous standard for data representation and as a specification language (based either DTD or XML-Schema). Hence, it is very attractive to use XML as the common format. The runtime environment leverages greatly the use of standard XML tools, which are likely to be already installed in a corporate environment.

A key component of the architecture is the use of VCML™, which is an XML-based meta-specification language. VCML™ defines a set of rules for constructing XML-based specifications in DTD or in XML-Schema. These rules facilitate Vocabulary Transformations among dialects. Another attraction of this architecture is that the vocabulary dictionaries and the ontology dictionaries are not required in the runtime environment. Instead, the runtime environment requires only XML specifications (again either in the form of DTDs or in the form of XML-schema) and XSLT transformation specifications. These XML-based specification languages are ubiquitous in corporate environments.

We start the description of the architecture of FIG. 20 with the design time environment. It is presumed that the ontology and vocabulary dictionaries have already been constructed using any available technique, such as the tools described above. For each vocabulary of interest, the vocabulary dictionary and associated ontology dictionary will be used to generate three sets of specifications.

The first specifications are a set of XML-Schemas specifications (known as XSDs) that provide an XML specification for the vocabulary consistent with the VCML™ specification guidelines. This step can be skipped if the vocabulary already has a XML specification. The purpose of the generated XML specification is to support a format transformation from the original vocabulary format to an XML format. The vocabulary and the semantics of the documents are not to be changed during the format conversion. It is the responsibility of the XSD generator to read the vocabulary dictionary and generate the corresponding XSDs for that vocabulary.

The second set of specifications are the XSLT maps that define a vocabulary transformation from the vocabulary of interest into a normalized vocabulary. These are called the "normalize" XSLT maps for the vocabulary of interest. The default is to base the normalized vocabulary on the concept-ids stored in the ontology dictionary, but any normalized vocabulary would suffice. The XSLT Generator is responsible for generating the required XSLT maps to the normalized vocabulary.

The third set of specifications are the XSLT maps that define a vocabulary transformation from the normalized vocabulary back into the vocabulary of interest. Hence, these XSLT maps are the inverse of the maps generated in the second step. These are called the "de-normalize" XSLT maps for the vocabulary of interest. The same normalized vocabulary must be used in both the second and third step. The XSLT Generator is again responsible for generating the required XSLT maps from the normalized vocabulary. Note that steps 2 and 3 are required for all vocabularies of interest, even those with XML specifications.

With respect to the runtime environment in FIG. 20, consider a non-XML source document to begin with, as illustrated by the "Source1" documents. The first step is to present source document to a Formatter supporting the source document's specification language and format. For example, all EDI documents, regardless of which EDI vocabulary, would be presented to the EDI Formatter. The Formatter has the responsibility to perform a Format Transformation on the document so as to re-format it into an XML document compliant with the XSD specifications of the source vocabulary. The resulting XML will conform to the VCML™ guidelines. Note that for an XML source document this first step is skipped.

The second step is to present the document to a XSLT Engine, which is a standard commercial product. The XSLT Engine uses the generated XSLTs for the source vocabulary to transform the source document from the source vocabulary into the chosen normalized vocabulary. (The XSLTs are the "normalize" maps for the source vocabularies, which generated in step 2 of the design process.) The result is a document in normalized VCML™, which is an XML document in the normalized vocabulary.

The third step is to transmit the document in normalized VCML™ to the recipient. The fourth step occurs upon receipt of the document, where it is again presented to the XSLT Engine. The XSLT Engine uses the generated XSLTs for the target vocabulary to transform the incoming normalized document from the normalized vocabulary into the chosen target vocabulary. (The XSLTs are the "de-normalize" maps for the target vocabulary, which was generated in step 3 of the design process.) The result is a document in target vocabulary, but in the XML format.

The fifth step is to transform the target document into the target format. This step use the Formatter for the target specification language and format. (It is assume that each Formatter can convert to and from its native format into a VCML™-based XML format. Obviously, this functionality could be broken down into 2 components if desired.) Note that for an XML target document fifth step is skipped. The fourth and fifth steps can be repeated multiple times for each received document, once for each distinct target vocabulary and format in which the received document needs to be processed.

The toolset illustrated in FIG. 20 and described in the preceding text is only one of many possible configurations that take advantage of Vocabulary based transformation to automate and facilitate transformation. The physical Vocabulary repository in conjunction with the knowledge and algorithms for inferring transformation relationships is the enabling technology for this toolset, but is certainly not limited to this specific architecture. One alternative may be to implement the Source Formatters to produce Normalized VCML™ directly, thus removing the requirement for the XSLT transformation.

The toolset described above does have some immediate and practical benefits however. Consider the fact that trading relationships and partners change over time. The addition of a new trading partner, call it Source3, is traditionally an expensive proposition. With direct one to one mapping between source and targets, the addition of Source3 requires new Semantic transformations between it and each of the three target partners. Since we have identified that this is a Format and Vocabulary transformation problem, and not a Semantic transformation problem, we have reduced the requirement to the development of a new Source3 Formatter that will perform the Format transformation from Source3 syntax to Source VCML™. This is an obvious conclusion once we have used the Vocabulary Based Transformation framework to analyze this transformation problem.

The following example is intended to illustrate and describe the mechanisms and value of the different types of transformations defined in this framework. This example is based on the HL7® standard. In our lexicon, HL7® defines the Ontology (set of concepts), the Vocabulary (specific labels), and the representation (syntax). This failure to make a clear separation between concepts, labels and syntax is common in many of the existing Ontology's and limits their flexibility in a global environment. Note that the HL7® Vocabulary Committee is defining a common Ontology using our terminology.

Figure 21:
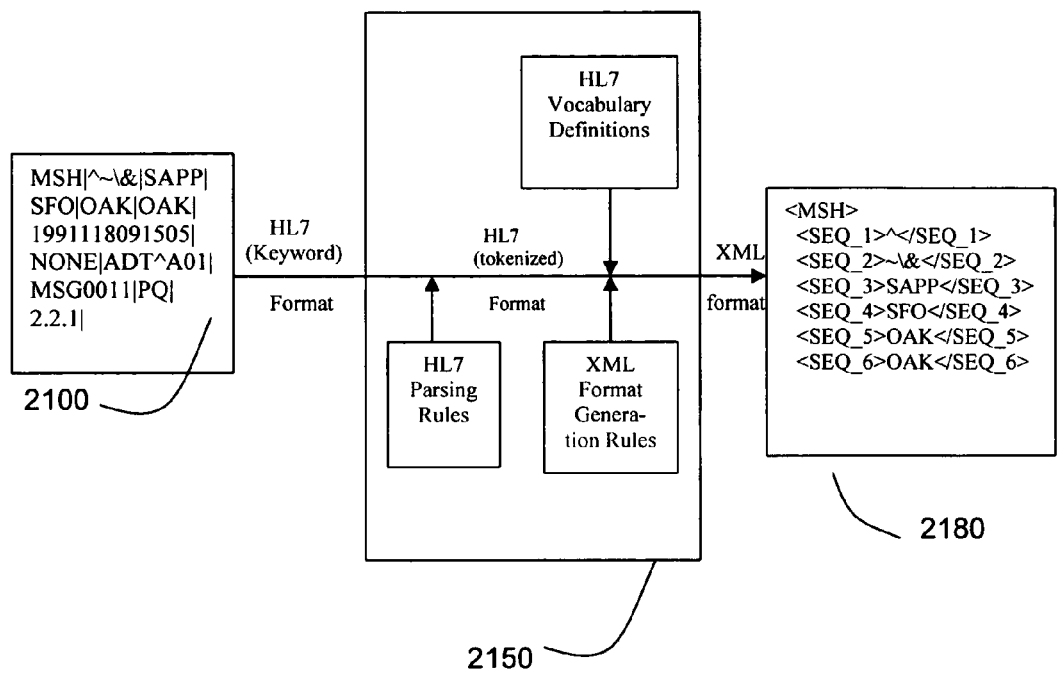
FIG. 21 is a schematic illustration of an HL7/XML format transformation.

The rise of XML and XML based tools has made format translation an extremely important operation. This task is the bi-directional translation of HL7® message syntax to an equivalent XML format. FIG. 21 illustrates such a translation.

Since this is format translation there are several invariants that can be relied on. The input and output representations belong to the same Ontology, the same Vocabulary, and are structurally equivalent. The only change is the syntax of the representation, from the HL7® Message format to XML. An interesting aspect of this translation is that the incoming HL7® message does not include labels for each incoming term. The HL7® format dictates that the characters at the beginning of the line define the message segment that can then be tokenized using the defined delimiters. However the meaning and labels for each individual token is not available from the message itself, but is based on the definition, or semantics, of the individual message. The interesting point is that to get the labels and understand the concepts of each field requires an external source of Metadata due to the nature of this message format. The need for this will become obvious as we work through this example.

The individual steps that occur in this translation are described below and shown in FIG. 21. The Format Translator is configured to accept HL7® messages and produce XML output. At this time the Translator can preload the HL7® Vocabulary definitions, parsing rules for the HL7® Message format and Generation rules for the XML format.

As shown in FIG. 21, the ADT^A01 (Patient Admission Message) 2100 arrives at the translator 2150. The parse rules for the HL7® message format are fairly straightforward due to the structured definitions of the format. The MSH denotes the message segment or type, and the next segment (i.e. ^~\&) identifies the set of delimiters used in this segment. The message type SAPP tells the parser how many fields to expect in this segment, which ones are optional and which ones are required. This information is necessary and sufficient to allow a computational engine to parse the message without human intervention.

In Format Translation the concepts associated with each individual element need not be identified because the structural equivalence indicates that the output can be generated in the same order as the input and with the same hierarchical relationship. Semantic Transformation would require much deeper understanding of the conceptual relationships.

Now that the input is tokenized, it is the responsibility of the generation rules to define how to produce the correct XML output 2180. The responsibility of the generation rules is two-fold in this example. As described earlier, the incoming ADT^A01 message does not have labels associated with the data fields. However XML generation requires unique labels for each field. It is the responsibility of the generation rules to define how those labels are obtained. In this example, the concept definition for 'Admission' defines the children concepts it has containment relations with. Each of these child concepts has an associated term in this Vocabulary. These are the terms used in the generated XML. The second role is to enforce any special requirements of the target syntax. In this case the XML Specification governs the final syntax. This may require that data or term labels with reserved XML characters will need to be escaped.

Figure 22:
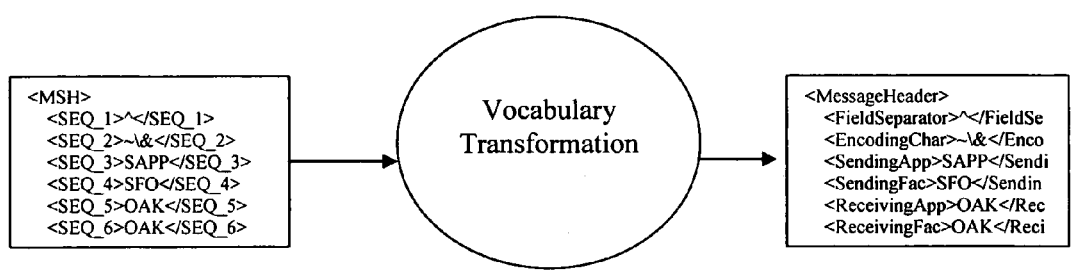
FIG. 22 is a schematic illustration of an HL7/XML vocabulary transformation.
Figure 23:
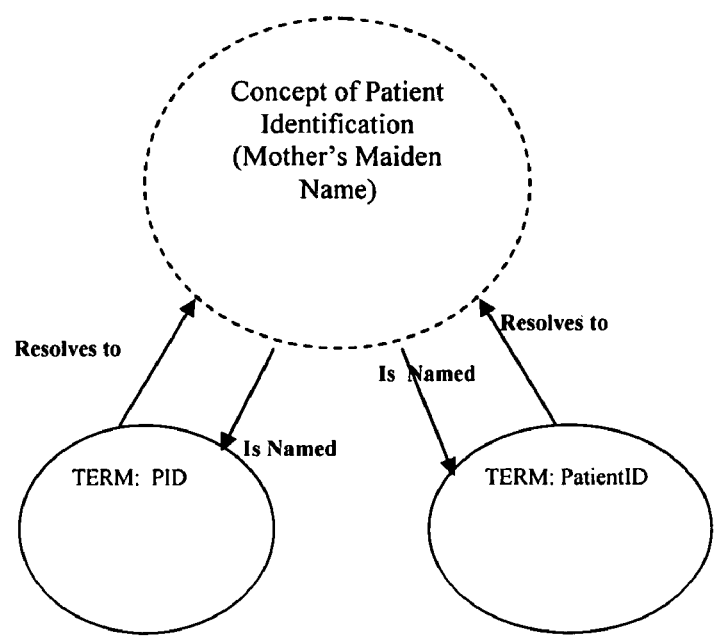
FIG. 23 is a schematic illustration of the relationship between terms and concepts.

The Vocabulary Translation problem, illustrated in FIG. 22, is similar to that of Format Translation in that the structures do not change—that is the input and output belong to the same Ontology. However now they may have different term labels so they belong to different Vocabularies. Due to this difference, Vocabulary Translation will always require the mapping of term to concepts. In Format Translation this was not always required. The PID and PatientID terms are illustrated in a relationship diagram in FIG. 23.

The conceptual framework described above defines that Vocabulary terms have these relationships between themselves and the underlying concept as defined in the Ontology. This allows us to automatically map one term label to another as is required for Vocabulary Transformation using the following steps.

For each term in the input message, identify the corresponding concept ID. The Resolution rules are used to perform this step. For this specific example we identify the concepts by the segment and sequence that they below to. For example, Sequence #6 in a PID Segment is always the concept of 'mother's maiden name'.

Once we have identified the concept, we can always map directly to a term in any Vocabulary of the Ontology using the naming rules. There may be multiple mappings but these are guaranteed to be semantically equivalent. This term is then used to replace the original term in the document.

Figure 24:
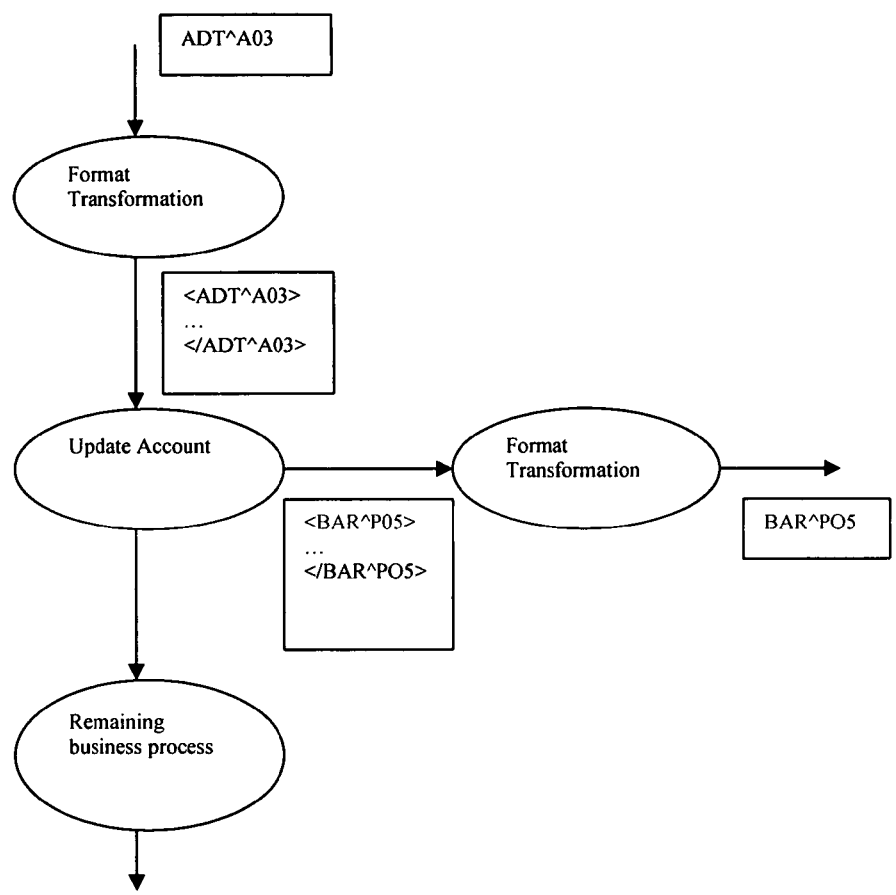
FIG. 24 is a schematic illustration of a process driven transformation.

To illustrate Process Driven Transformation, we now consider a healthcare application that understands the HL7®syntax (and therefore the HL7®Vocabulary and Ontology). With reference to FIG. 24, this application is designed to accept Patient Discharge events and process them by updating the rest of the health care providers systems. In this example, this includes updating the billing system by sending an update account HL7®message. There may be many other steps in the discharge process, but these two will be sufficient for our purposes.

The BAR^P05 update account message is defined to have 21 components in the HL7® v2.3 specification. The ADT^A03 discharge messages has 11 components. The important point is that 7 of those components are equivalent because not only do they share the same term (label)—they also name the same concept because they are from the same HL7®Ontology. In this example, over half of the fields of the BAR^P05 message can be automatically mapped from the original ADT^A03 message, without human intervention.

What is claimed is:

1. A data transformation system for accomplishing vocabulary-based data transformations of a first document to a second document using a computer-implemented framework that separates concepts from terms used to name the concepts, said data transformation system comprising at least one processor for executing:
    a specification parser that uses an ontology layer of the computer-implemented framework to define concepts, concept semantics, and concept structure used in the first document to derive an initial ontology dictionary;
    a specification analyzer that uses a vocabulary layer for labeling the concepts in the first document to derive an initial vocabulary dictionary;
    a specification refiner that uses a specification layer of the computer-implemented framework to specify refined concepts, refined concept semantics, refined concept structure, and refined labels of the initial ontology dictionary and the initial vocabulary dictionary to create a refined ontology dictionary and a refined vocabulary dictionary in computer-readable format; and
    a format generator that uses a representation layer for encoding data from the refined ontology dictionary and a refined vocabulary dictionary in conformance with the specification layer to create the second document based on the vocabulary-based data transformation of the first document.

2. A computer-implemented method for transforming a first document to a second document, said method comprising:
    developing an ontology specifying the concepts of a business process;
    parsing a first specification to determine machine processible definitions of a vocabulary and machine processible definitions of an ontology;
    analyzing the machine processible definitions of the vocabulary and the machine processible definitions of the ontology to build an initial vocabulary dictionary and an initial ontology dictionary;
    refining the initial ontology dictionary by removing concept redundancy by identifying equivalent concepts, selecting one of the equivalent concepts, and updating the initial ontology dictionary to reflect the selected concept in a refined ontology dictionary;
    updating the vocabulary from which the machine processible definitions of the first document are taken and correspond to concepts of the refined ontology dictionary to create a refined vocabulary dictionary;
    creating a second vocabulary in the second document corresponding to concepts of the refined ontology dictionary to thereby establish a relationship between the vocabulary of the first document and the vocabulary of the second document through the concepts of the refined ontology dictionary;
    determining the created concepts of the refined ontology dictionary corresponding to the refined vocabulary dictionary of the first document based on the first vocabulary;
    determining vocabulary of the second document corresponding to the created concepts; and
    converting vocabulary of the first document to vocabulary of the second document based on said determining steps.

3. A method as recited in claim 2, wherein said step of developing an ontology comprises assigning a unique identification value to each of the concepts.

4. A method as recited in claim 2, wherein said developing an ontology step comprises arranging plural variables in a hierarchical structure and correlating a concept to each unique combination of variable and the containment of the variable in structure.

5. A method as recited in claim 4, wherein the structure is an XML Data Dictionary.

6. A computer-implemented method for transforming a first document of a first vocabulary to a second document of a second vocabulary within a collaborative system for effecting a business process, said method comprising:
    extracting first data by parsing at least a portion of the first document in accordance with parsing rules;
    determining a first concept corresponding to the first data based on the first vocabulary;
    entering the first concept in an initial ontology dictionary;
    determining a second concept of the second document corresponding to the first concept;
    removing redundant concepts by identifying equivalent concepts among the first concept and the second concept, selecting one of the equivalent concepts, and updating the determined first concept and the determined second concept from the initial ontology dictionary to create a refined ontology dictionary to reflect the selected equivalent concept; and
    generating second data corresponding to the second document based on generation rules.

7. A method as recited in claim 6, wherein the parsing rules are based on the first vocabulary and the generation rules are based on said second vocabulary.

* * * * *